(12) United States Patent
Skrobanski

(10) Patent No.: US 10,186,080 B2
(45) Date of Patent: Jan. 22, 2019

(54) IMAGE PROCESSING

(71) Applicant: Arithmetica Ltd, Shepperton (GB)

(72) Inventor: George Skrobanski, Shepperton (GB)

(73) Assignee: Arithmetica Ltd, Shepperton (GB)

( * ) Notice: Subject to any disclaimer, the term of this patent is extended or adjusted under 35 U.S.C. 154(b) by 116 days.

(21) Appl. No.: 14/769,074

(22) PCT Filed: Feb. 27, 2014

(86) PCT No.: PCT/GB2014/000068
§ 371 (c)(1),
(2) Date: Aug. 19, 2015

(87) PCT Pub. No.: WO2014/132020
PCT Pub. Date: Sep. 4, 2014

(65) Prior Publication Data
US 2016/0012638 A1    Jan. 14, 2016

(30) Foreign Application Priority Data

Feb. 27, 2013    (GB) .................................. 1303540.7

(51) Int. Cl.
*G06T 17/20*      (2006.01)
*G06T 17/00*      (2006.01)
(Continued)

(52) U.S. Cl.
CPC ............ *G06T 17/20* (2013.01); *G01S 7/4817* (2013.01); *G01S 17/87* (2013.01);
(Continued)

(58) Field of Classification Search
CPC .................. G06T 17/20; G06T 17/00; G06T 2207/10028; G06T 2210/56; G01S 7/4817; G01S 17/87; G06K 9/00201
See application file for complete search history.

(56) References Cited

U.S. PATENT DOCUMENTS 5,623,790 A *  4/1997  Lalvani .................... A63B 9/00
                                                                52/79.1
7,451,704 B1 * 11/2008  Gold ..................... F42B 12/205
                                                                102/494
(Continued)

FOREIGN PATENT DOCUMENTS

CN        102902864        1/2013
EP           1691335        8/2006
(Continued)

OTHER PUBLICATIONS

European Patent Office, Rijswijk; International Search Report and Written Opinion PCT/GB2014/000068; dated Jul. 7, 2014; 4 Pages.
(Continued)

*Primary Examiner* — Abderrahim Merouan
(74) *Attorney, Agent, or Firm* — Fisherbroyles LLP; Micah D. Stolowitz

(57) ABSTRACT

Methods and apparatuses are described for generating three-dimensional representations of sets of objects automatically from point cloud data of those sets of objects. The methods and apparatuses partition the space occupied by the objects into a plurality of volumes. If points within a volume approximately coexist on a surface, such a volume is designated a surface volume. Surface volumes with approximately coplanar surfaces are combined to form larger surface volumes. If points within a volume approximately coexist on a line, such a volume is designated a line volume. Line volumes with approximately collinear lines are combined to form larger line volumes.

25 Claims, 21 Drawing Sheets

(51) Int. Cl.
*G06K 9/00* (2006.01)
*G01S 7/481* (2006.01)
*G01S 17/87* (2006.01)

(52) U.S. Cl.
CPC .......... *G06K 9/00201* (2013.01); *G06T 17/00* (2013.01); *G06T 2207/10028* (2013.01); *G06T 2210/56* (2013.01)

(56) References Cited

U.S. PATENT DOCUMENTS

| | | | |
|---|---|---|---|
| 8,244,026 B2 | 8/2012 | Nahari | |
| 8,581,162 B2 * | 11/2013 | Campbell | G01B 11/0608 250/201.2 |
| 9,024,970 B2 * | 5/2015 | Lynch | G01C 21/3635 345/629 |
| 9,766,712 B2 * | 9/2017 | Schpok | G06F 3/017 |
| 2002/0120920 A1 * | 8/2002 | Jayaram | G06F 17/50 717/137 |
| 2003/0021822 A1 * | 1/2003 | Lloyd | A61F 2/00 424/423 |
| 2003/0101030 A1 * | 5/2003 | Harwood | F01N 13/1872 703/2 |
| 2005/0168460 A1 * | 8/2005 | Razdan | G06F 17/30398 345/419 |
| 2006/0061566 A1 | 3/2006 | Verma | |
| 2006/0155427 A1 * | 7/2006 | Yang | G08G 1/07 701/1 |
| 2008/0281839 A1 * | 11/2008 | Bevan | G06F 17/30241 |
| 2009/0060345 A1 * | 3/2009 | Wheeler | G01S 17/89 382/195 |
| 2009/0096809 A1 * | 4/2009 | Bezryadin | G06T 11/001 345/597 |
| 2010/0191461 A1 * | 7/2010 | Zeng | B60W 40/076 701/532 |
| 2010/0209013 A1 | 8/2010 | Minear | |
| 2010/0253688 A1 * | 10/2010 | Cui | G01S 13/723 345/443 |
| 2010/0305997 A1 * | 12/2010 | Ananian | G06F 9/5038 705/7.27 |
| 2011/0125811 A1 * | 5/2011 | Witmer | G01C 21/32 707/812 |

FOREIGN PATENT DOCUMENTS

| | | |
|---|---|---|
| EP | 2124196 | 11/2009 |
| EP | 2385496 | 11/2011 |
| EP | 2385496 A1 * | 11/2011 |
| GB | 2456301 | 7/2009 |
| WO | 2010042466 | 4/2010 |

OTHER PUBLICATIONS

UK Intellectual Property Office; Search Report GB1303540.7; dated Jun. 5, 2014.

Lyubomir G. Zagorchev et al.; A Curvature-Adaptive Implicit Surface Reconstruction for Irregularly Spaced Points; IEEE Transactions on Visualization and Computer Graphics vol. 18, No. 9, Sep. 2012; pp. 1460-1473.

Aparjithan Sampath et al; Segmentation and Reconstruction of Polyhedral Building Roofs From Aerial Lidar Point Clouds; IEEE Transactions on Geoscience and Remote Sensing, vol. 48, No. 3; Mar. 2010; pp. 1554-1567.

\* cited by examiner

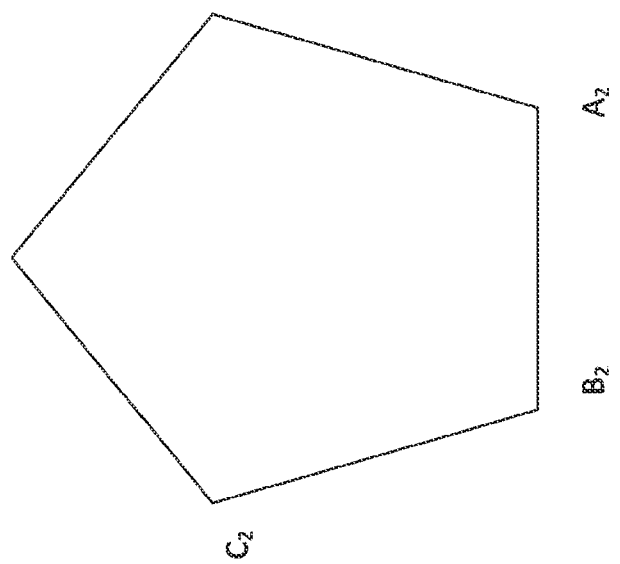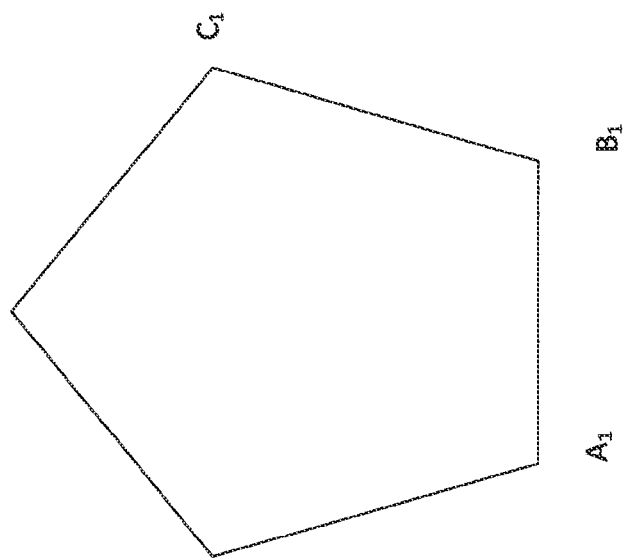
Fig. 16

IMAGE PROCESSING

This invention relates to methods and apparatuses for generating three-dimensional representations of sets of objects automatically from point cloud data of those sets of objects.

The production of accurate three-dimensional (3D) computer models of real-world objects has proved very useful in the fields of archaeology, architecture, civil and mechanical engineering, and geographical mapping as well as many other areas. In many of these applications, a scanner automatically measures a large number of points on the surface of an object to produce a 3D "point cloud" of surface points. This cloud of points may contain a very large amount of data and, for this as well as other reasons, may be difficult to manipulate or process efficiently for incorporation into a final model. There is therefore an interest in converting point cloud data into a more easily manipulated form, for example into a 3D computer-aided design (CAD) model format.

The nature of point cloud data means that there are aspects of its analysis not present in other imaging techniques. For example, medical imaging techniques such as magnetic resonance imaging (MRI) and computed axial tomography (CAT) scan a particular volume and produce a 3D image from continuous density values defined at every point in the scanned volume. For a point cloud however, the density of points is a function of the distance and angle to the scanner position, and the scanner settings, rather than indication of the density or other attribute of the object. Moreover large regions of a scanned volume may be completely devoid of any features.

Currently, point cloud data is given to a specialist (or team of specialists) who interprets the data by recognizing structures and who manually generates a 3D model of what has been identified. This process has several shortcomings. Firstly, it requires very many man-hours to complete, which leads to increased costs. Secondly, different people interpreting the same point cloud may produce different 3D models. The user of such models therefore cannot rely too heavily on their accuracy. This second difficulty is particularly prevalent in noisy point cloud data resulting from the use of moving scanners. Although they are noisier, moving scanners are preferable to static scanners for scanning regions larger than the range of the scanning technology in question.

Other apparatus are disclosed which claim to automatically produce 3D models but which suffer from other drawbacks. For instance, U.S. Pat. No. 8,244,026 describes an apparatus for processing a light detection and ranging (LIDAR) point cloud of a ground scan. A ground filter filters out the ground so that features extending above the ground may be identified. Subsequently, an automatic feature search and recognition unit may recognize points associated with a certain feature and replace them with a virtual object representing that feature. Such an apparatus uses the ground as a reference point and therefore cannot be used for other applications. In addition, only objects for which there is a virtual object may be replaced; a specialist may have to monitor the results or model more unusual features manually.

EP 1 691 335 B1 describes an apparatus for fitting surfaces to point clouds along two-dimensional profiles. The drawback here is that the profiles must first be defined, either manually or by some automatic mechanism that is not part of the invention. By contrast the present invention does not require two dimensional or other profiles to be provided.

ClearEdge 3D produce software that automatically extracts features from a point cloud. This software may use the technique described in WO 2010/042466 wherein one or more surface patches are extracted from a point cloud and used to determine one or more principal axes of an object. However, this method cannot be used when the scanned objects do not possess common aligned principle axes, as is especially the case when analysing moving scanner-generated data. In practice, ClearEdge 3D requires users to manually identify initial versions of features, copies of which are then automatically identified.

Aspects of the present invention described in the claims provide a computationally efficient, labour-saving solution that is useful for, but not limited to, scenarios where prominent features are identified as real-world objects and replaced with virtual equivalents. Furthermore, exemplary embodiments of the invention are sufficiently robust that they may convert point cloud data from a moving scanner system.

The present invention requires frequent calculation of the eigenvalues and the corresponding eigenvectors of 3×3 symmetric matrices. This can be readily accomplished by means of the diagonalization method of Jacobi, as described for example by G. H. Golub and C. F. van Loan, 1983, "Matrix Computations", John Hopkins University Press. However any other valid eigenvalue and eigenvector computation method can be employed instead, provided that it can correctly cope with the case that two or all of the eigenvalues may not be distinct.

The invention is defined by the appended claims. Other features and advantages of exemplary embodiments of the present invention will be apparent from the following description taken in conjunction with the accompanying drawings.

BRIEF DESCRIPTION OF THE DRAWINGS

FIG. 16 is a plan view showing two alternative positions of a next edge on a polygon.

DETAILED DESCRIPTION OF PREFERRED EMBODIMENTS

Figure 1:
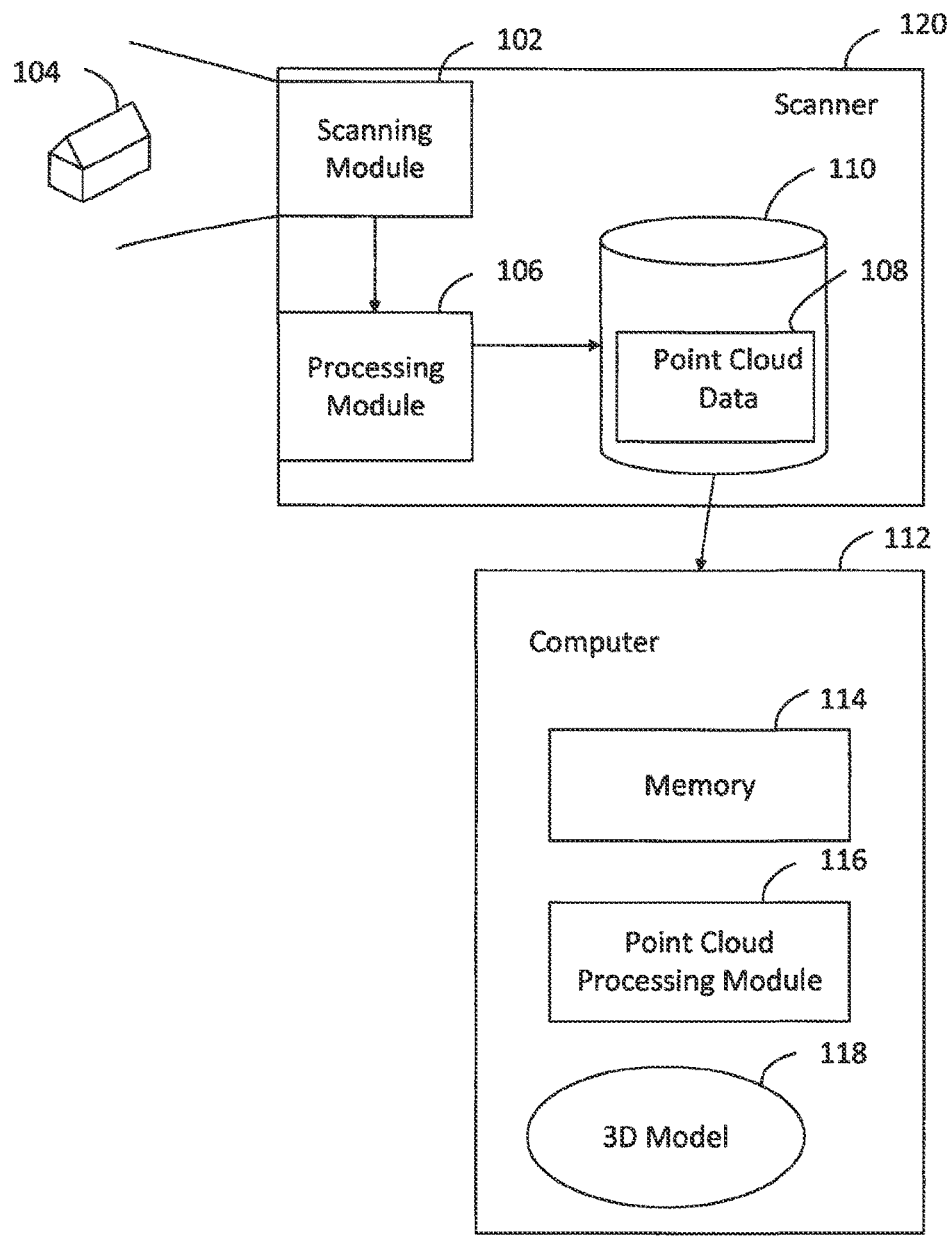
FIG. 1 shows an exemplary system in which point cloud data is generated and converted into a three-dimensional model.

FIG. 1 is a block diagram showing the general arrangement of apparatus according to one exemplary embodiment of the invention. A scanner 120 includes a LIDAR scanning module 102 that emits a series of laser pulses. These laser pulses are scanned across the surfaces of objects of interest 104 and the pulse is reflected from the surfaces and received by a sensor in the scanning module. From the time-of-flight of the laser pulse, a processing module 106 in the scanner 120 may calculate the distance to the points on the surfaces and may generate a point cloud based on this distance data. The point cloud data 108 may then be stored on a point cloud database 110 before further processing. When further processing is required, the point cloud data is sent to a computer 112, where a point cloud processing module performs a method for converting the data into a 3D representation 118. An example of such a method is described in detail below. When the method is complete, the 3D representation 118 may be stored as a data file in memory 114 and/or output in a viewable form.

There are many different applications for which such a 3D representation can be used. For example, in a car assembly line scenario, different components designed to fit together may be scanned by a LIDAR scanner. The resulting point clouds can be converted into 3D vector models and it can be determined whether the components can fit together within a particular tolerance. It would take so many man-hours to achieve accurate results using conventional techniques that, without automatic techniques like those described herein, it would not be practical within the timescale required.

Another example application relates to roadside crash barriers. Many public authorities require a minimum height for crash barriers on roads with fast moving traffic. To ensure compliance with this requirement, a vehicle-mounted scanner can scan many sections of roads to produce point cloud data for the crash barriers. This data can be converted to a 3D model and the barrier height determined. Again, manual methods to convert the data to a vector graphic model would take a long time. However, the problem is made worse because different manual operators would very likely determine different heights for the same sections of barrier. Parties with different vested interests may provide the fits to the data such that, intentionally or not, the resulting model might represent a preferred reality of the modeller. If the modeller determines a particular crash barrier to be sufficiently high when it is not, the consequences could be disastrous. Thus, an objective method like that described herein would be preferable.

A point cloud is a set of three-dimensional vectors, $x^{(k)}=(X_k,Y_k,Z_k)$. Suppose the point cloud points are distributed over the surfaces of one or more 3D objects. The technique described herein converts the point cloud into a CAD model representation of the objects. These consist of sets of connected line segments comprising the edges of closed plane polygons (representing planar surfaces of the objects) and other line segments representing objects such as power lines, telephone lines etc. that do not have planar surfaces. Objects consisting of non-planar surfaces such as cylinders (for examples pipes and tunnels) are represented by a sufficient number of small planar surfaces that are tangential to the surfaces of the objects. This methodology allows any 3D object to be represented.

Figure 2:
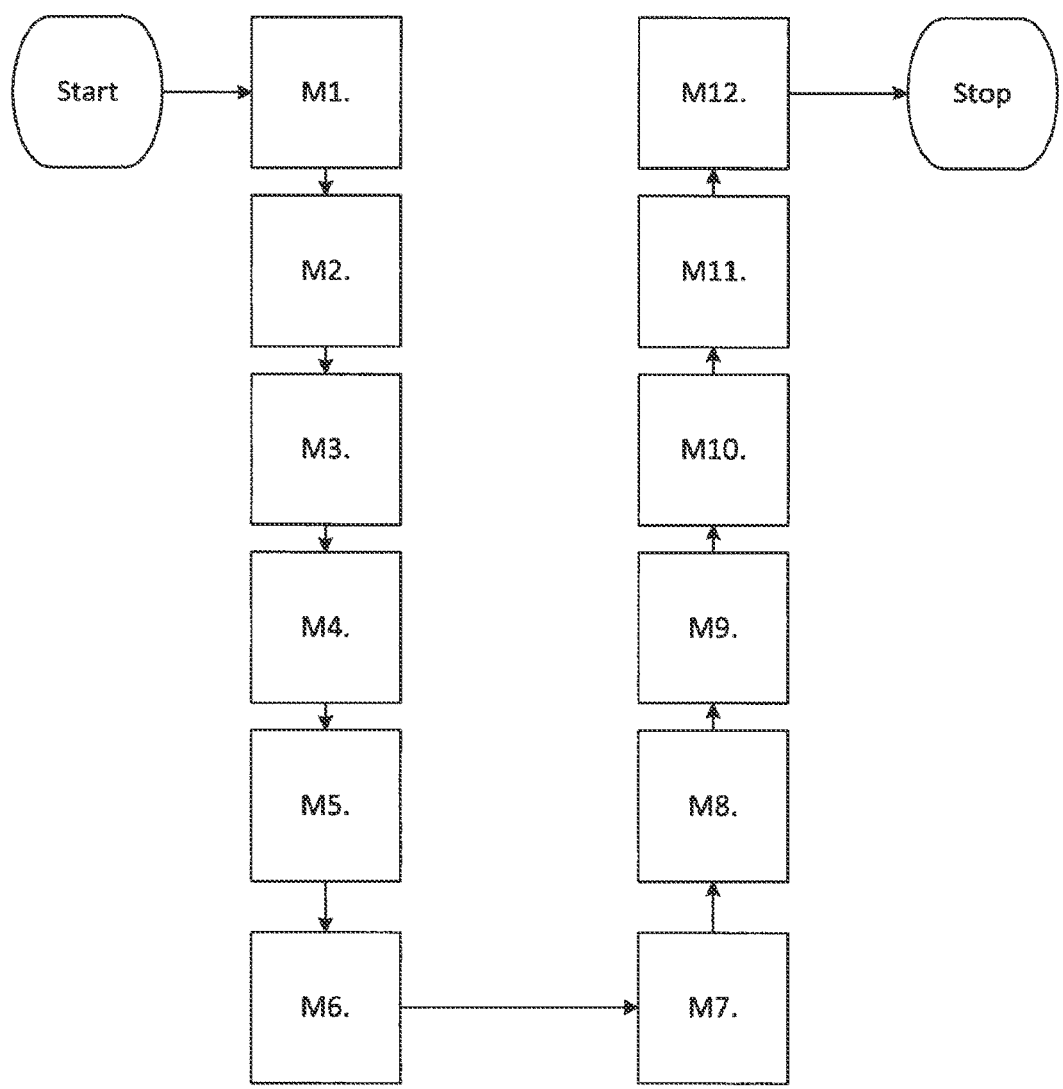
FIG. 2 show a flow chart of the main Steps M1 to M12 of the method.

FIG. 2 is a flow chart illustrating the main steps M1 to M12 of the method.

M1. Superimpose a 3D grid on the portion of space occupied by the objects. The grid partitions the space into a large but finite list of cubes. To avoid wasting computer storage space, the list excludes any empty cubes. In the current embodiment the cubes are all the same size. The length of a side of each cube is called its resolution. If necessary (for example because locally the scanned surface has high curvature) some of these cubes can be sub-divided into smaller cubes, which can be further sub-divided, and so on. In this way a different local resolution can be used at different places. Other partitions of 3D space, for example using tetrahedrons, are also possible. Although in what follows the term cube is used, it will be appreciated that the method applies equally to tetrahedra or other space-filling tessellation.

Figure 3:
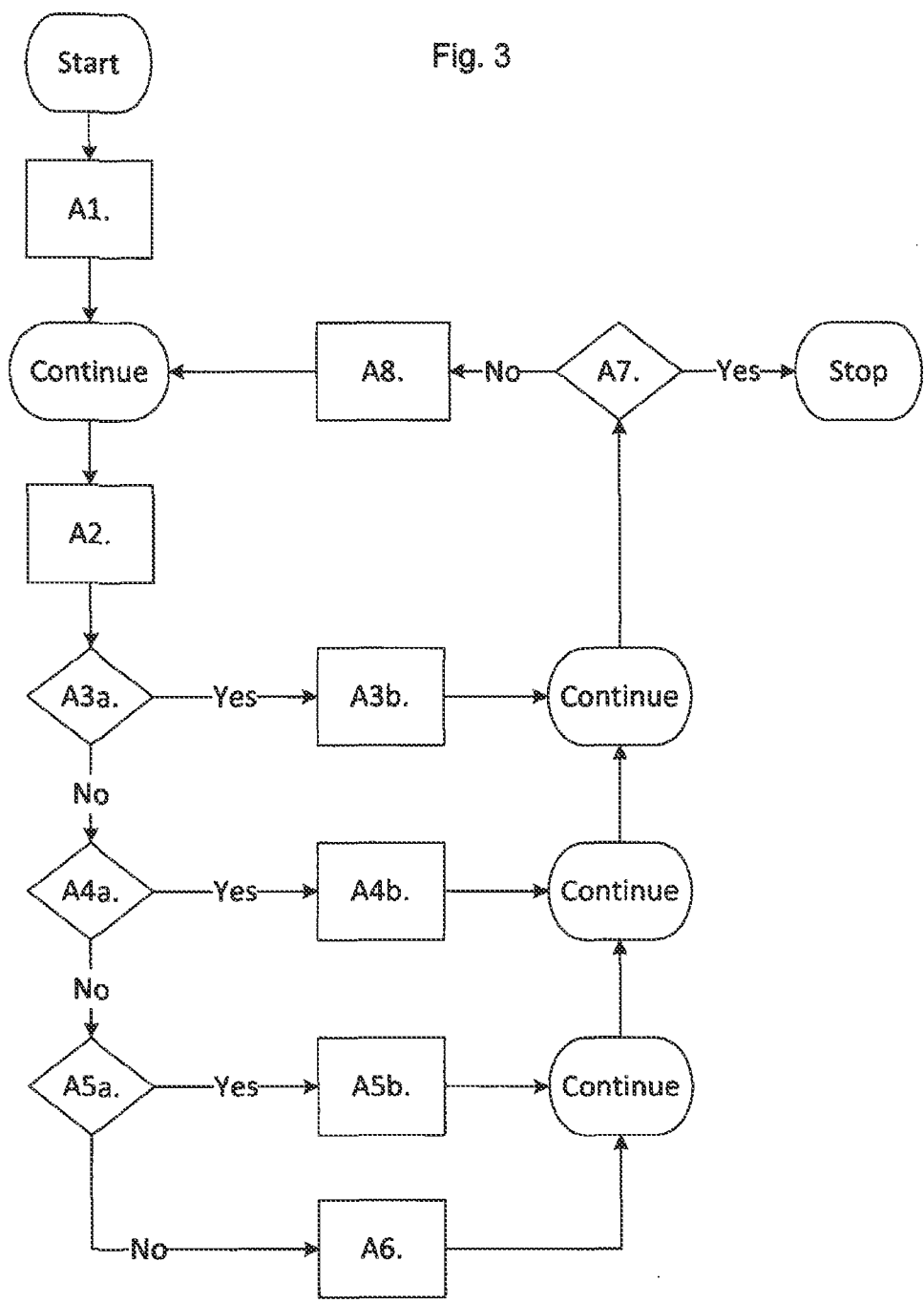
FIG. 3 shows a flow chart of Steps A1 to A7 of an exemplary method of classifying cubes as containing coplanar or collinear points.

M2. Classify each of the non-empty cubes as being either: co-incident (all the points in the cube are located approximately at the same location), coplanar (all the points in the cube lie approximately in one plane), collinear (all the points in the cube lie approximately along one straight line) or space-filling (locally the point cloud is neither a line or a surface). The details of Step M2 are discussed in more detail in Steps A1 to A8 below and are illustrated in FIG. 3.

Figure 4:
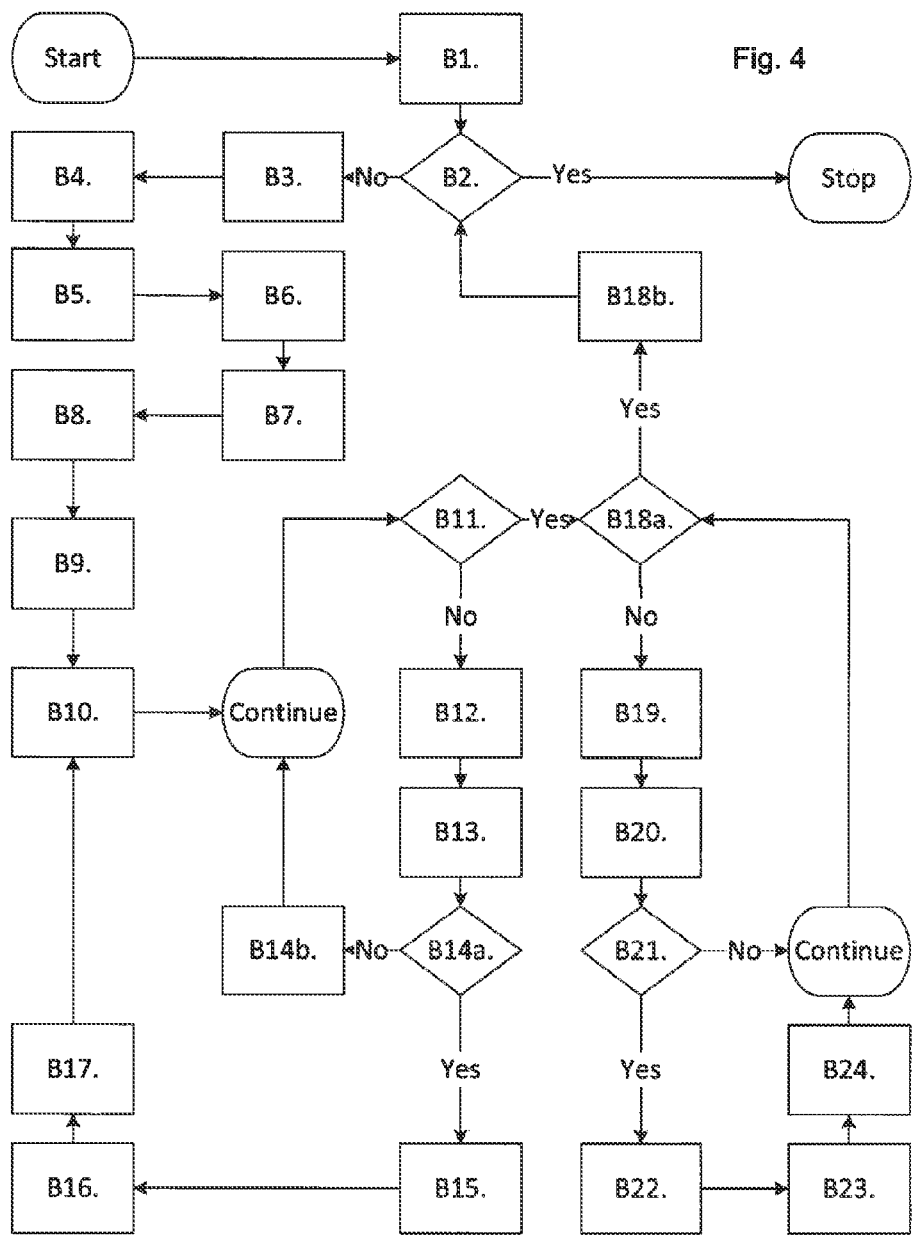
FIG. 4 shows a flow chart of Steps B1 to B24 of an exemplary method of identifying surfaces by combining coplanar cubes along a common plane to form plane cube sets.

M3. Grow plane cube sets by combining neighbouring coplanar cubes whose planes (the planes of their point cloud points) are approximately coplanar. Each plane cube set is associated with a single mathematical plane called the common plane of the cube set. At the conclusion of Step M3, every coplanar cube will belong to exactly one plane cube set. Each plane cube set will contain one or more coplanar cubes. The details of Step M3 are explained in more detail in Steps B1 to B24 below and are illustrated in FIG. 4.

Figure 5:
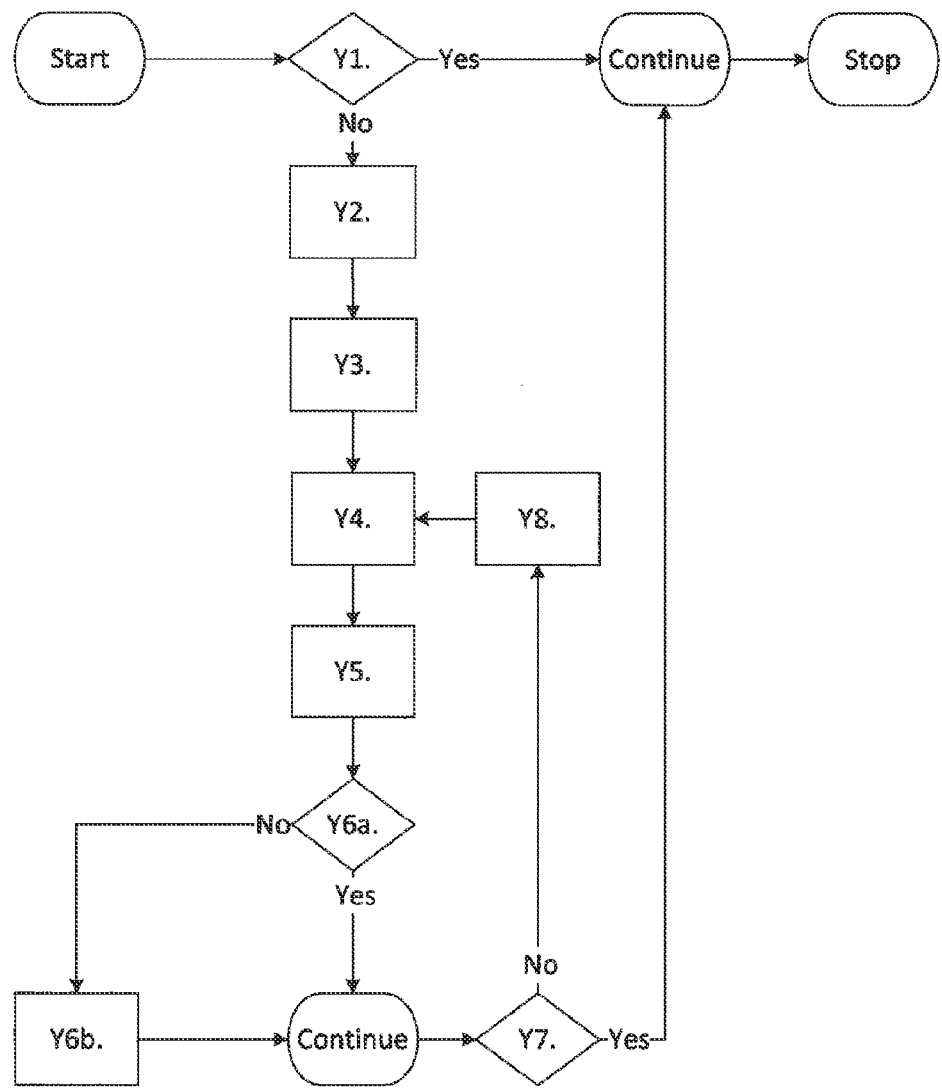
FIG. 5 shows a flow chart of Steps Y1 to Y8 of an exemplary method of flattening cubes belonging to a plane cube sets so that they are all intersected by the common plane.

M4. Flatten each plane cube set as follows. If any coplanar cube is not intersected by the common plane of its plane cube set, remove that cube from the plane cube set and project all its points onto the common plane. If any projected point lies in a cube that does not already belong to the plane cube set, add that cube to the plane cube set. This means that at the end of Step M4 the plane cube set may contain cubes that were not classified as coplanar at Step M2. Cubes may now belong to more than one plane cube set. However, any cube that belongs to more than one plane cube set will be intersected by the common planes of every plane cube set that it belongs to. The details of Step M4 are explained in more detail in Steps Y1 to Y8 below and are illustrated in FIG. 5.

M5. For each plane cube set, create a plane boundary cube set. This consists of all the cubes on the boundary of the plane cube set. The details of Step M5 are explained in detail in Steps X1 to X10 below and illustrated in FIG. 6.

Figure 7:
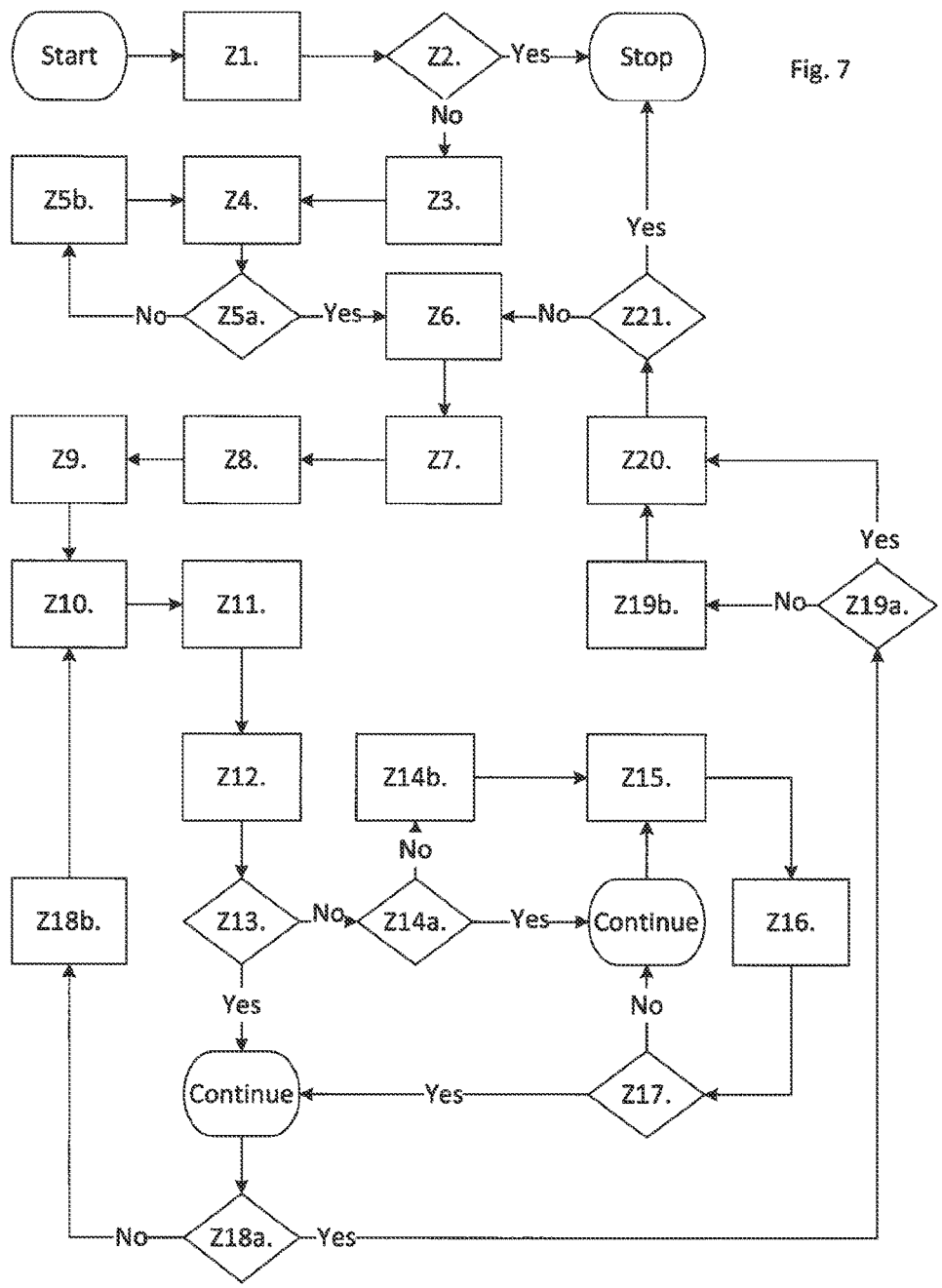
FIG. 7 shows a flow chart of Steps Z1 to Z21 of an exemplary method of tracing a boundary polygon around the outside of or around holes inside of a plane cube set.

M6. The boundary polygons of each plane cube set are traced in order around the outside of the plane cube set, and also around any holes in the interior of the plane cube set, using edges of cubes belonging to the plane cube boundary set. The details of Step M6 are explained in more detail in Steps Z1 to Z21 below and are illustrated in FIG. 7.

Figure 8:
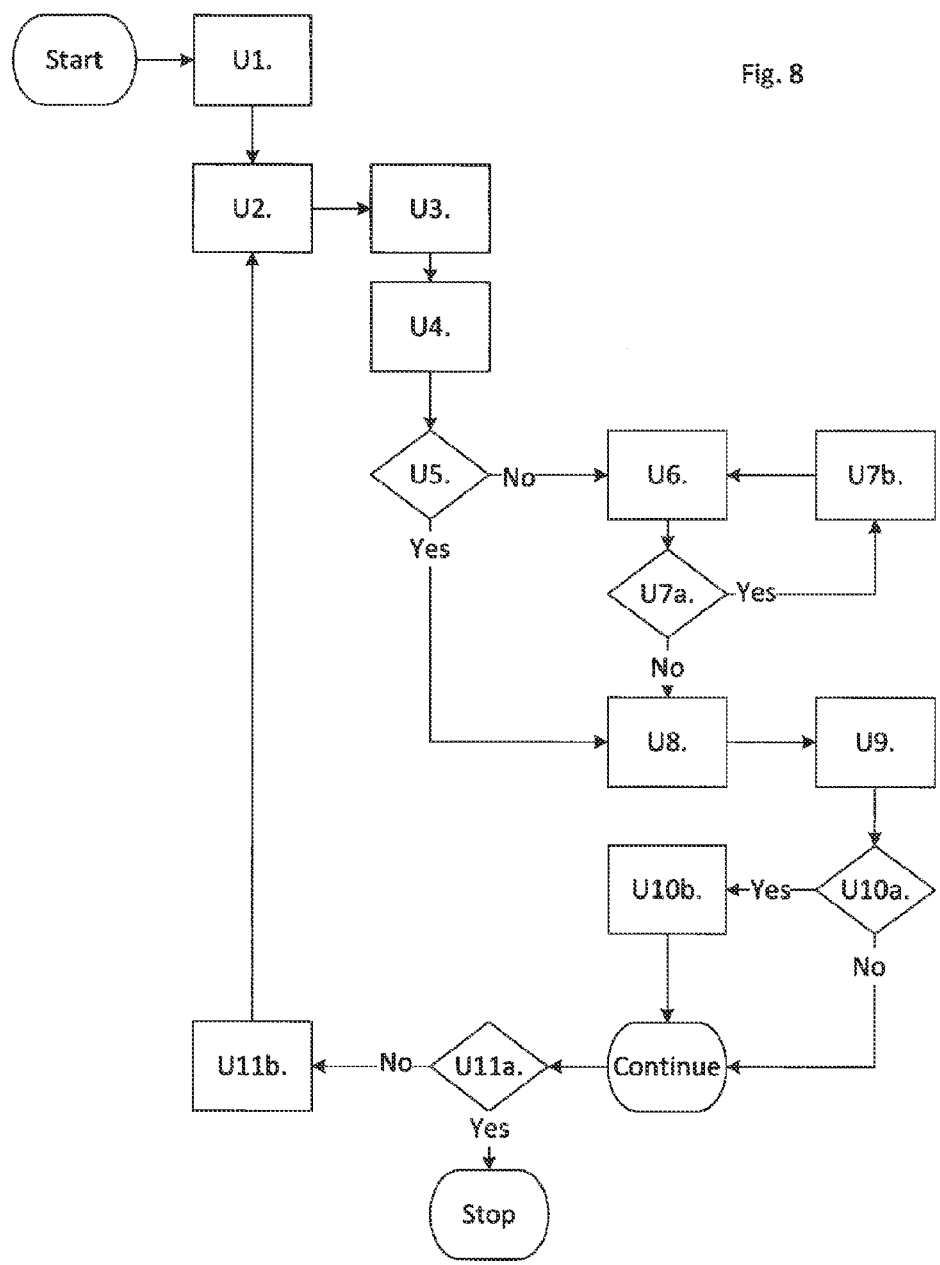
FIG. 8 shows a flow chart of Steps U1 to U11 of an exemplary method of identifying the position of cloud boundary points along boundary polygons.

M7. A cloud boundary point is estimated for each edge of each boundary polygon. Unlike the boundary polygon, whose edges lie along faces of cubes, each cloud boundary point lies close to the convex hull of the point cloud points projected onto the common plane of each plane cube set. The cloud boundary points are stored in the order in which they are encountered in each separate boundary polygon calculated at Step M6. The details of Step M7 are explained in more detail in Steps U1 to U11 below and are illustrated in FIG. 8.

Figure 9:
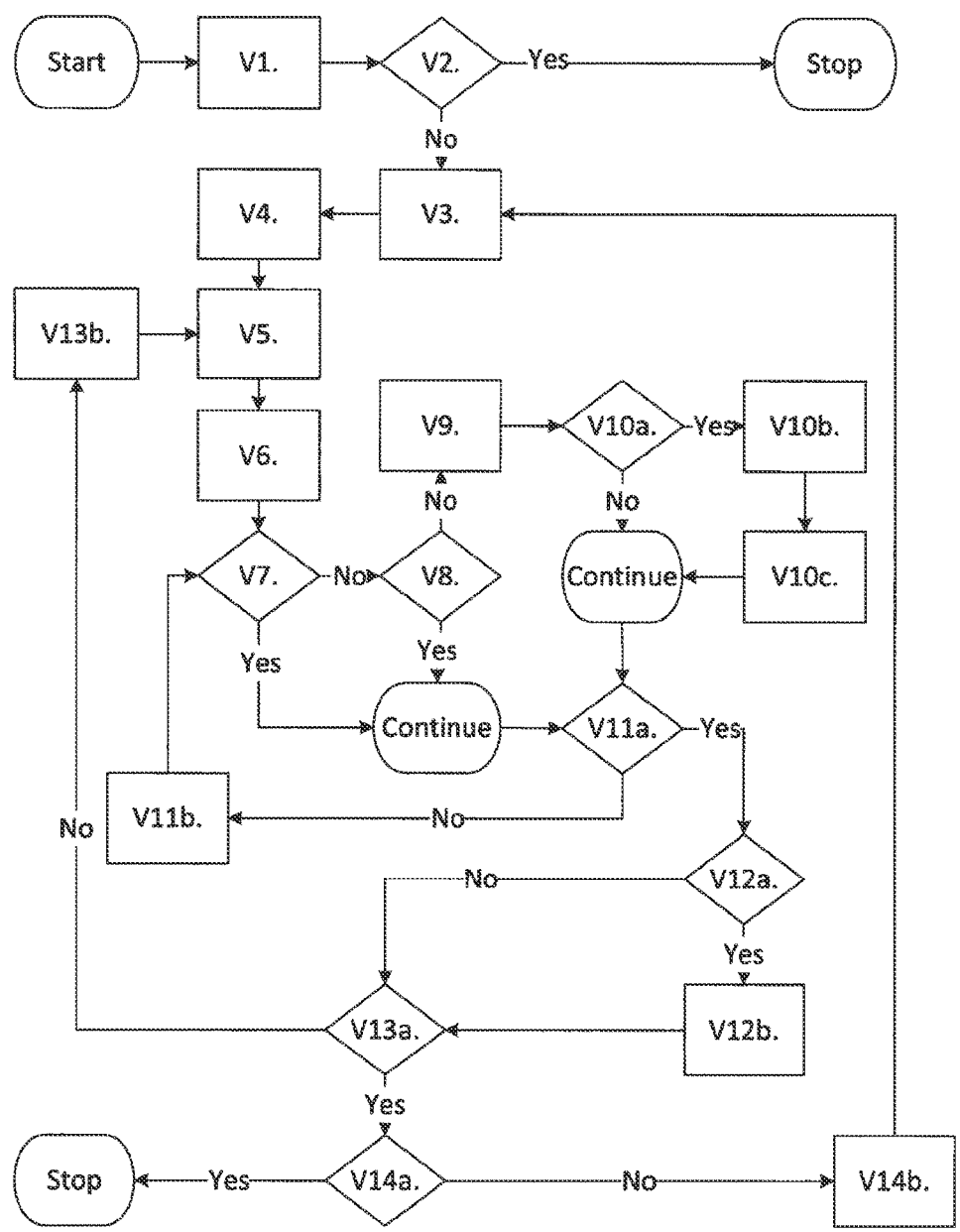
FIG. 9 shows a flow chart of Steps V1 to V14 of an exemplary method of moving cloud boundary points onto intersections with neighbouring planes.

M8. If any cloud boundary point lies sufficiently close to the intersection of its common plane with that of another plane cube set, the position of the cloud boundary point is moved to the nearest point on the line of intersection. If the cloud boundary point lies sufficiently close to the intersection with more than one plane, the cloud boundary point is moved to the nearest line of intersection. The details of Step M8 are explained in more detail in Steps V1 to V14 below and are illustrated in FIG. 9.

M9. The boundary polygon edges are converted into polylines consisting of the distinct cloud boundary points in the order in which they are stored at the end of Step M8. A separate polyline is created for each boundary polygon.

Figure 10:
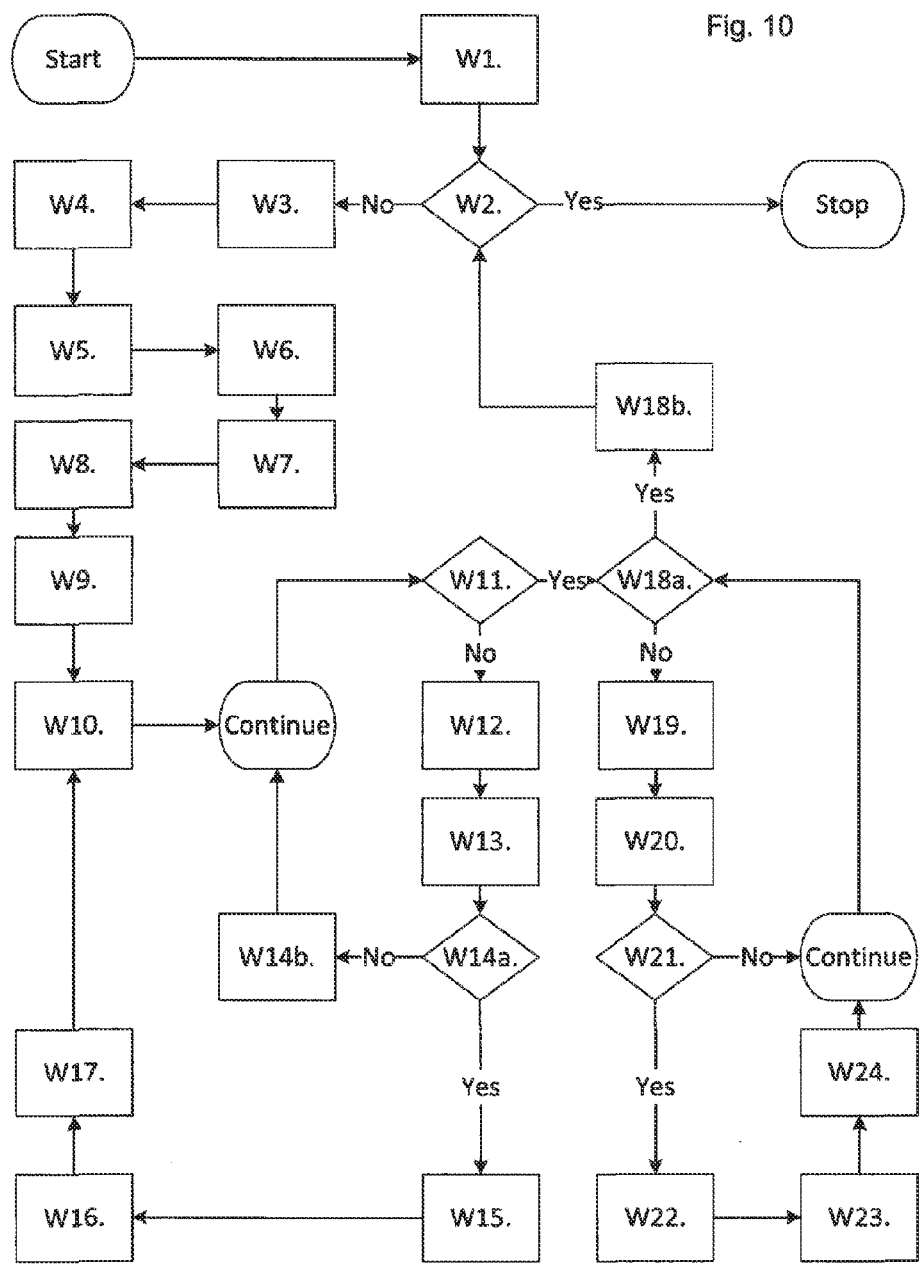
FIG. 10 shows a flow chart of Steps W1 to W18 of an exemplary method of identifying lines by combining collinear cubes along a common line to form line cube sets.

M10. Neighbouring collinear cubes whose lines are approximately collinear are combined to form line cube sets. Each line cube set is associated with a single mathematical straight line called the common line of the cube set. At the conclusion of Step M10, every collinear cube will belong to exactly one line cube set. Each line cube set will contain one or more collinear cubes. The details of Step M10 are explained in more detail in Steps W1 to W24 below and are illustrated in FIG. 10.

Figure 11:
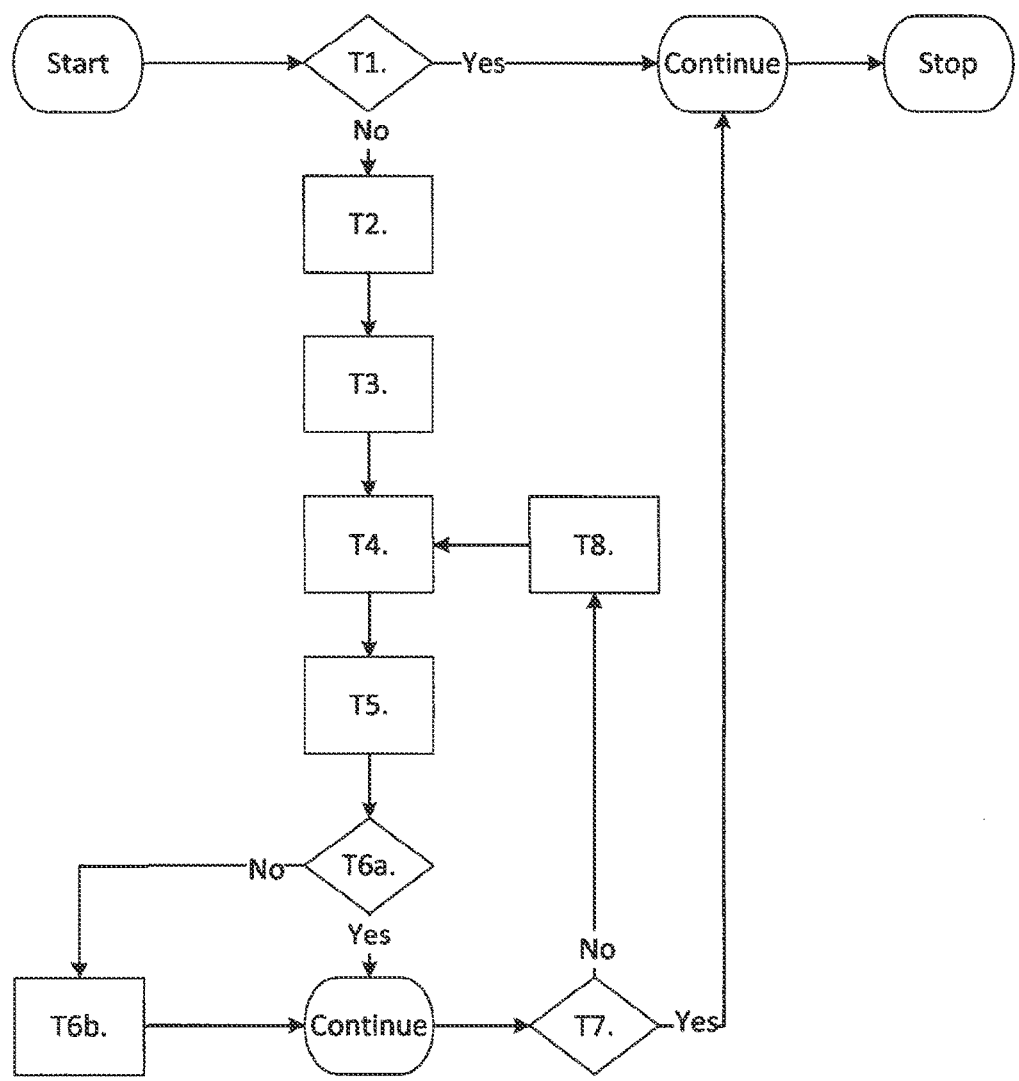
FIG. 11 shows a flow chart of Steps T1 to T8 of an exemplary method of flattening cubes belonging to a line cube sets so that they are all intersected by the common line.

M11. Flatten each line cube set as follows. If any collinear cube is not intersected by the common line of its line cube set, remove that cube from the line cube set and project all its points onto the common line. If any projected point lies in a cube that does not already belong to the line cube set, add that cube to the line cube set. This means that at the end of Step M11 the line cube set may contain cubes that were not classified as collinear at Step M2. Cubes may also belong to more than one line cube set. (Indeed cubes may simultaneously belong to line and plane cube sets.) However any cube that belongs to more than one line cube set will be intersected by the common lines of every line cube set that it belongs to. The details of Step M11 are explained in more detail in Steps T1 to T8 below and are illustrated in FIG. 11.

Figure 12:
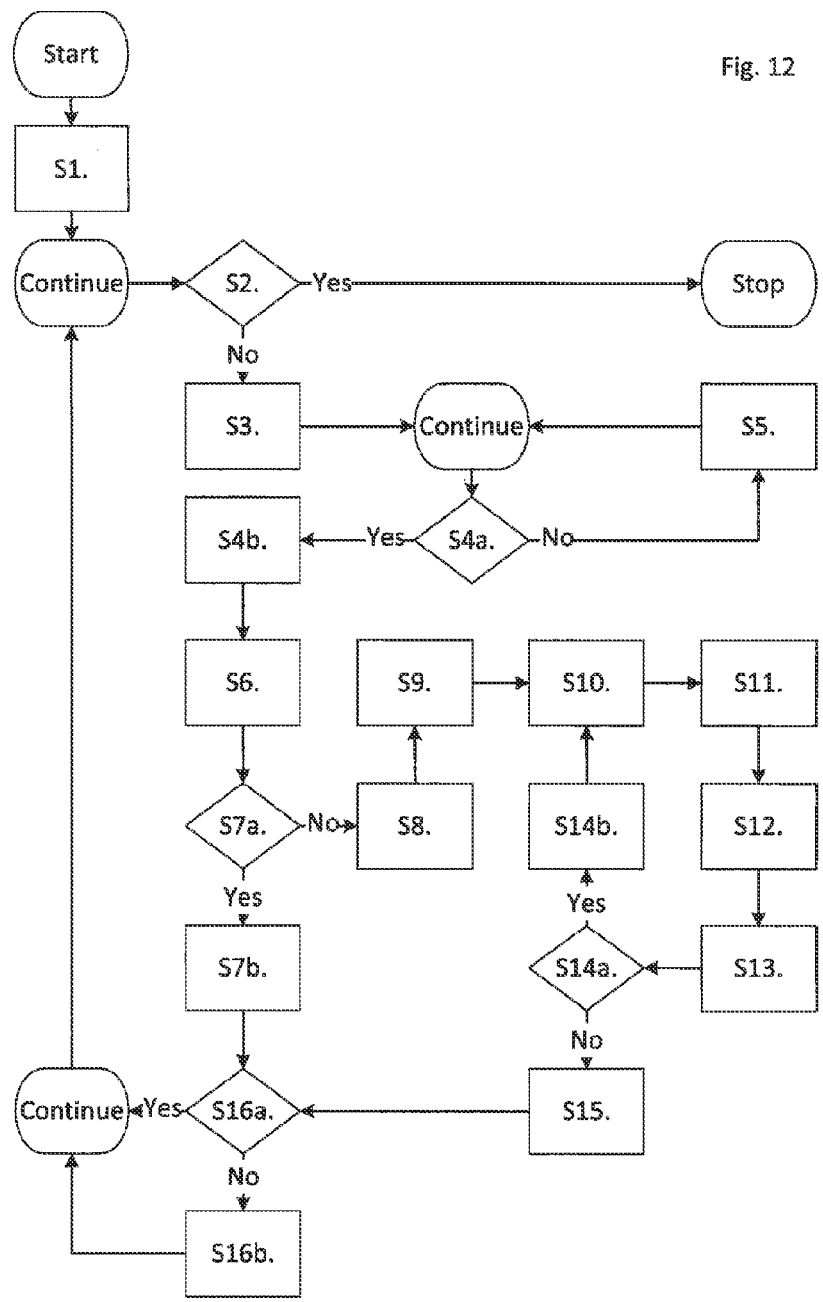
FIG. 12 shows a flow chart of Steps S1 to S16 of an exemplary method of finding the positions of the ends of finite line segments from within a line cube set.

M12. The end points of one or more line segments along the common line of each line cube set are identified. The details of Step M12 are explained in more detail in Steps S1 to S17 below and are illustrated in FIG. 12.

As already mentioned, the end result of this process is therefore the production of polygons with well-defined boundaries as well as other line segments. Further processing may be performed whereby adjacent polygon boundaries meeting particular requirements are identified as defining parts of object edges. By combining more and more polygons in this way, and with sufficient data, entire 3D objects can therefore be reconstructed. When this is achieved, objects can be identified as key features and data about the number and position of the key features as well other relevant information can be provided to the user of the 3D model. Identifying or comparing objects directly from point cloud data is highly inefficient. For example, if the point cloud of an object contains ~$10^6$ points, comparing two such objects requires ~$10^{12}$ computations (each computation comparing one object's point cloud points with those of another with a similar number of points). By contrast, if the same object is represented by a model consisting of a small number of polygons (e.g. ~100) then far fewer computations (~10,000) are required, so that the process is far more computationally efficient. In a model of a street scene, common street furniture articles may be identified by their shape (combination of polygons). These can be replaced with accurate virtual models or data about street furniture position can be extracted by an interested party. For producing three-dimensional images, if parallel photographic images are available, image portions derived therefrom may be associated with each polygon as a surface fill.

FIG. 3 is a flow chart of Step M2 illustrating Steps A1 to A9 below which classify each of the cubes (created in Step M1) as being either empty (the cube does not contain any point), co-incident (all the points in the cube are located approximately at the same location), coplanar (all the points in the cube lie approximately in one plane), collinear (all the points in the cube lie approximately along one straight line), or space-filling. Note that in all cases if a point cloud point lies exactly on a face or vertex between two or more cubes, only one of these cubes is considered to contain that point.

Mathematical surfaces and lines have zero thickness. Because point clouds are subject to measurement errors and other perturbations collectively referred to as noise, the point cloud points themselves may lie a small distance away from the true mathematical surface or line that they represent. To allow for this, the calculation described in Steps A1 to A9 makes use of a thickness tolerance. Its optimal value depends on the accuracy of the point cloud.

The covariance matrix is defined as $$V = \frac{1}{n}\sum_{k=1}^{n}(x^{(k)} - \bar{x})(x^{(k)} - \bar{x})^T$$

where n is the number of point clouds points in the cube and the summation is over all such points and where $$\bar{x} = \frac{1}{n}\sum_{k=1}^{n} x^{(k)}$$

The classification process is as follows.
A1. Select the first cube in the list of non-empty cubes.
A2. Using Jacobi's method, or any other valid method, compute the three eigenvalues of the covariance matrix of the point cloud points contained within the cube. Set any negative eigenvalue to zero. If there is exactly one point in the cube then all three eigenvalues are set to zero.
A3. If all the eigenvalues are less than the thickness threshold, then classify the cube as coincident and go to Step A7. This occurs when all the points in the cube are approximately co-incident.
A4. If only two of the eigenvalues are less than the thickness tolerance, classify the cube as collinear and go to Step A7. This occurs when all the points in the cube lie approximately along the same mathematical line.
A5. If only one of the eigenvalues is less than the thickness tolerance, classify the cube as coplanar and go to Step A7. This occurs when all the points in the cube lie approximately in the same mathematical plane.
A6. Classify the cube as being space filling. This occurs when a non-empty cube is neither co-incident, collinear or coplanar.
A7. If the cube is the last in the list then stop.
A8. Select the next cube in the list and go to Step A2.

FIG. 4 is a flow chart of Step M3 showing in detail Steps B1 to B24 below which grow a set of contiguous coplanar cubes along a common plane. Each set of coplanar cubes grown in this way is called a plane cube set. The calculation accumulates the number of points in the plane cube set $$n = \sum_{l} n_l$$

where $n_l$ is the number of points in coplanar cube l. The calculation also accumulates the sum of the point cloud points $$s = \sum_{l} s^{(l)} \text{ where } s^{(l)} = \sum_{k=1}^{n_l} x^{(k,l)}$$

and the sum of the outer products $$W = \sum_{l} W_l,$$

where $$W_l = \sum_{k=1}^{n_l} x^{(k,l)}[x^{(k,l)}]^T$$

and wherein both cases the summation is over all point cloud points in all coplanar cubes l in the plane cube set, and where $x^{(k,l)} = (X_{kl}, Y_{kl}, Z_{kl})$ is the kth point cloud point in coplanar cube l.

The mean $\bar{x}$ and covariance matrix V of the point cloud points in all the coplanar cubes in the plane cube set can be computed by $$\bar{x} = s/n \text{ and } V = \frac{1}{n}W - \bar{x}\bar{x}^T$$

Similarly, the mean $\bar{x}^{(l)}$ and covariance matrix $V^{(l)}$ of the point cloud points in the coplanar cube l can be computed by $$\bar{x}^{(l)} = s^{(l)}/n_l \text{ and } V^{(l)} = \frac{1}{n_l}W^{(l)} - \bar{x}^{(l)}[\bar{x}^{(l)}]^T$$

The equation of the mathematical plane through all the point cloud points in the coplanar cube l is $[u^{(l)}]^T(x-\bar{x}^{(l)})=0$ where $u^{(l)}$ is the vector of unit length that is normal to the plane, is equal to the eigenvector of the covariance matrix $V^{(l)}$ that corresponds to the unique smallest eigenvalue of $V^{(l)}$.

Similarly, the equation of the mathematical plane through all the point cloud points in all the cubes of the plane cube set is $u^T(x-\bar{x})=0$ where u is the vector of unit length that is normal to the common plane, is equal to the eigenvector of the accumulated covariance matrix V that corresponds to the unique smallest eigenvalue of V.

At Steps B14 and B21 the method compares the currently accumulated common plane with the plane fitted through the current coplanar cube l to decide whether the two planes are coplanar. A different criterion is used in the two steps.

Criterion A is used in Step B14 and requires that $u^T u^{(l)} > \cos \theta_0$ which ensures that the angle between the two planes is less than $\theta_0$ radians, and $|u^T(\bar{x}^{(l)}-\bar{x})|d_1$ which ensures that the distance of the mean $\bar{x}^{(l)}$ to the accumulated common plane is less than $d_1$ distance units.

Figure 13:
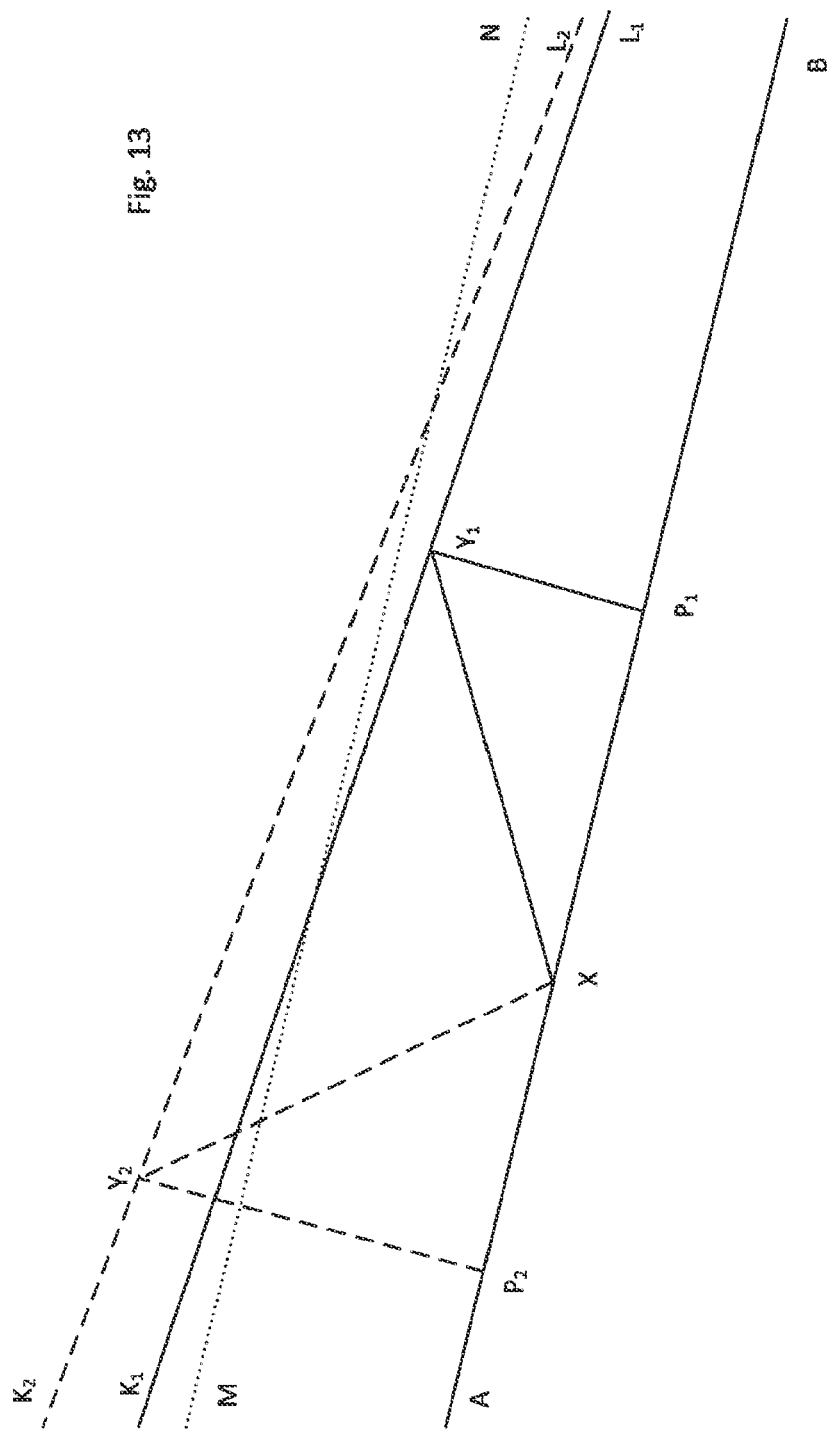
FIG. 13 is a plan view showing an exemplary method of calculating the distance between planes.

The geometry of the second of these conditions is illustrated in FIG. 13 which is a cross section through both planes containing $\bar{x}$ and $\bar{x}^{(l)}$. Line AB represents the cross-section of the accumulated common plane and $K_1L_1$ represents the cross-section of the plane of a particular current cube. The point X is the mean $\bar{x}$ of the accumulated common plane and $Y_1$ is the mean $\bar{x}^{(l)}$ of the current plane so that $XY_1 = \bar{x}^{(l)} - \bar{x}$. $P_1$ is the nearest point to $Y_1$ on the cross-section AB so that the distance of $Y_1$ from AB is the length $|P_1Y_1|$. If $\angle P_1Y_1X = \phi$ then $|P_1Y_1| = |XY_1| \cos \phi$. Because $P_1Y_1$ is normal to AB it follows that the angle between $XY_1$ and the normal u is also $\phi$ and therefore $u^T(\bar{x}^{(l)}-\bar{x}) = |XY_1| \cos \phi | P_1Y_1 |$ is the distance of $\bar{x}^{(l)}$ from the accumulated common plane. In FIG. 13 the dashed line $K_2L_2$ represents the cross-section of the plane of another current cube. $Y_2$ is the position of $\bar{x}^{(l)}$ in the instance of this other current cube. $P_2$ is the foot of the perpendicular from $Y_2$ onto AB so that in this case the distance of $\bar{x}^{(l)}$ from the accumulated common plane is $P_2Y_2$. The dotted line MN is a parallel to AB and a distance $d_1$ from it. It follows that $Y_1$ is deemed to be close enough to AB but $Y_2$ is not.

Criterion B is used in Step B21 and requires that $$\frac{1}{n_l}\sum_{k=1}^{n_l} [u^T(x^{(k,l)} - \bar{x})]^2 < d_2$$

which ensures that the average squared distance of each point $x^{(k,l)}$ in coplanar cube l from the common plane is less than $d_2$ distance units.

The actual steps of the plane growing process are as follows.

B1. Create an unused list of cubes containing all the coplanar cubes that were identified at Step M2. Any cube in this list is called an unused cube.

B2. If the unused list is empty then stop.

B3. Create an empty list of cubes called the plane cube set. This plane cube set will be grown to contain all the coplanar cubes along the common plane of the cubes in the plane cube set. Eventually every cube that is currently in the unused list of cubes will be moved to a plane cube set, even if that plane cube set contains only one cube.

B4. Set the current cube to the first cube in the list of unused cubes.

B5. Create an empty list of cubes called the candidate list. This list will contain unused coplanar cubes that are being considered as candidates for inclusion in the plane cube set.

B6. Create an empty list of cubes called the special list. This list will contain unused coplanar cubes that have recently been rejected as candidates for inclusion in the plane cube set.

B7. Move the current cube from the unused list into the plane cube set. Thus every plane cube set contains at least one cube.

B8. Set the sum of the points in the plane cube set equal to the sum of the points in the current cube.

B9. Set the sum of the outer products of the points in the plane cube set equal to the sum of the outer products of the points in the current cube.

B10. Add all neighbour cubes of the current cube that are in the unused list to the candidate list. Here a cube is neighbour of the current cube if it shares a face or vertex with the current cube.

B11. If the candidate list is empty go to Step B18.

B12. Set the current cube to the first cube in the candidate list.

B13. Remove the current cube from the candidate list.

B14. If the current cube does not satisfy criterion A then add the current cube to the special list and go to Step B11.

B15. Move the current cube from the unused list to the plane cube set.

B16. Add $s_1$ the sum of the points in the current cube l to the accumulated sum s of the points in the plane cube set.

B17. Add $W_1$ the sum of the outer product of the points in the current cube l to the accumulated sum W of the outer products of the points in the plane cube set and go to Step B10.

B18. If the special list is empty then output the plane cube set data and go to Step B2.

B19. Set the current cube to the first cube in the special list.

B20. Remove the current cube from the special list.

B21. If the current cube does not satisfy criterion B then go to Step B18.

B22. Move the current cube from the unused list to the plane cube set.

B23. Add $s_1$ the sum of the points in the current cube l to the accumulated sum s of the points in the plane cube set.

B24. Add $W_1$ the sum of the outer product of the points in the current cube l to the accumulated sum W of the outer products of the points in the plane cube set and go to Step B18.

FIG. 5 is a flow chart of Step M4 showing in detail the steps Y1 to Y8 that are applied to each cube in a plane cube set to ensure that every cube in the plane cube set is intersected by its common plane. The effect of Step M4 is to flatten the plane cube set. Step M4 is necessary because the common plane changes whenever a new cube is added to the plane cube set in Step M3. There is no guarantee that cubes added early in the growth process of a plane cube set will continue to be intersected by the common plane after it has changed. Step M4 compensates for this. Steps Y1 to Y8 are applied separately to every cube in the plane cube set and can therefore be applied in parallel if required.

The steps of the plane cube set flattening process are as follows.

Y1. If the cube is intersected by the common plane then stop.

Y2. Remove the cube from the plane cube set.

Y3. Set the current point to the first point cloud point in the cube.

Y4. Project the current point $x^{(k)}$ on to the nearest point $p^{(k)}$ on the common plane $u^T(x^{(k)}-\bar{x})=0$ using the formula $p^{(k)}=x^{(k)}-[u^T(x^{(k)}-\bar{x})]u$.

Y5. Find the cube that contains the projected point. Call this cube the projected cube. The precise details of this calculation depend on how the cubes are arranged in space. In one exemplar, the cubes are arranged rows, columns and layers. Then the projected point $p^{(k)}=(P_k,Q_k,R_k)$ is contained by the cube in row I, column J and layer K if $$\left. \begin{array}{l} X_0+(I-1)h \leq P_k < X_0+Ih \\ Y_0+(J-1)h \leq Q_k < Y_0+Jh \\ Z_0+(K-1)h \leq R_k < Z_0+Kh \end{array} \right\}$$

where h is the resolution and $X_0, Y_0, Z_0$ are chosen so that $X_0 \leq P_k, Y_0 \leq Q_k$ and $Z_0 \leq R_k$ for all k.

Y6. If the projected cube does not already belong to the plane cube set then add the projected cube to the plane cube set. Here the projected cube means the cube which contains the projected point $p^{(k)}$.

Y7. If the current point is the last point cloud point in the cube then stop.

Y8. Set the current point to the next point cloud point in the cube and go to Step Y4.

Figure 6:
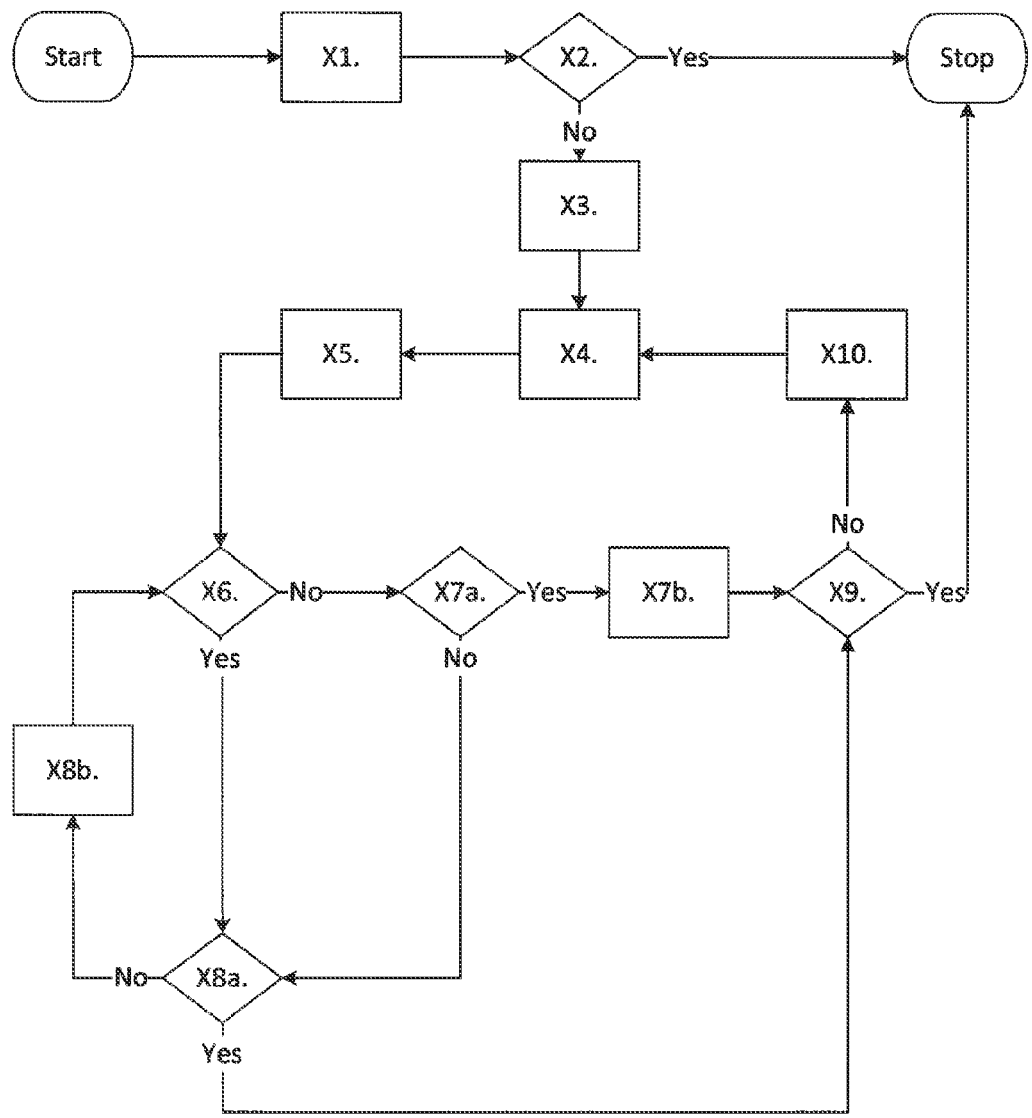
FIG. 6 shows a flow chart of Steps X1 to X10 of an exemplary method of identifying cubes along that form the boundary of a plane cube set.

FIG. 6 is a flow chart of Step M5 showing in detail the Steps X1 to X10 that are applied to identify the members of the plane cube set that have neighbours that do not belong to the plane cube set but are intersected by its common plane. The identified cubes are stored in the plane boundary cube set. At the stage that Step M5 is applied, each plane cube set has been flattened so that all its cubes are intersected by its common plane.

X1. Create an empty plane boundary cube set.

X2. If the plane cube set is empty then stop.

X3. Set the current cube to the first cube in the plane cube set.

X4. Generate a list containing the 18 orthogonal neighbour cubes of the current cube. Here an orthogonal neighbour cube means a cube that shares a face or an edge with the current cube. Note that cubes that share only one vertex with the current cube are not orthogonal neighbours.

X5. Set the test cube to the first cube in the list of orthogonal neighbour cubes.

X6. If the test cube is a member of the plane cube set then go to Step X8.

X7. If the common plane intersects the test cube then add the current cube to the plane boundary cube set and go to Step X9.

X8. If the test cube is not the last cube in the list of orthogonal neighbour cubes then set the test cube to the next member of the list and go to Step X6.

X9. If the current cube is the last cube in the plane cube set then stop.

X10. Set the current cube to the next cube in the plane cube set and go to Step X4.

Figure 14:
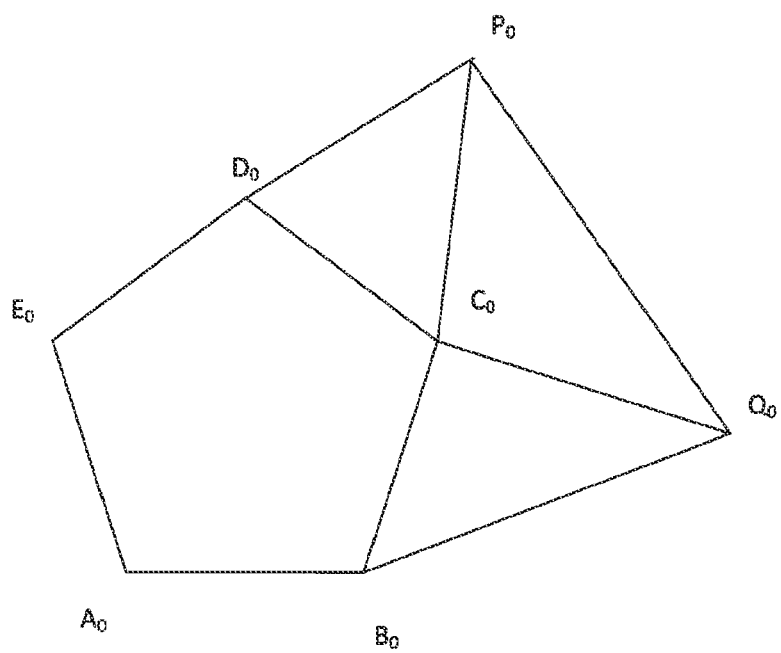
FIG. 14 is a plan view showing an exemplary polygonal fan.

FIG. 7 is a flow chart of Step M6 showing in detail the sub steps Z1 to Z21 that are applied to trace the boundary polygons of each plane cube set. At the stage that Step M6 is applied, each plane cube set has been flattened so that all its cubes are intersected by its common plane. The intersection of the common plane with any cube that intersects the common plane (including cubes that do not belong to the cube plane set) is a convex polygon called the cube's intersection polygon. Any two cubes intersected by the common plane are said to be coplanar neighbours if their intersection polygons share at least one common edge. Note that cubes whose intersection polygons only share one vertex are not coplanar neighbours. For example in FIG. 14, polygons $D_0C_0P_0$ and $C_0B_0Q_0$ are both coplanar neighbours of polygon $A_0B_0C_0D_0E_0$ but the polygon $C_0Q_0P_0$ is not.

A polygonal fan is a list of two or more convex polygons arranged consecutively around a central vertex so that each polygon, except possibly the last, shares a common edge with the next polygon in the list. For example in FIG. 14 the polygons $C_0D_0E_0A_0B_0$, $C_0B_0Q_0$, $C_0Q_0P_0$ and $C_0P_0D_0$ comprise a four member polygonal fan about the central vertex $C_0$. The common edges are $C_0B_0$, $C_0Q_0$ and $C_0D_0$. Similarly in FIG. 15 the polygons GHO, GOB and GBF comprise a three member polygonal fan about the central vertex G. The common edges are GO and GB.

For brevity in what follows, the intersection polygon of a cube that belongs to the plane cube set is called an internal polygon; otherwise it is called an external polygon. The intersection polygon of every cube in the plane boundary cube set is an internal polygon and is a coplanar neighbour of at least one external polygon. The edges shared between internal and external polygons are called external edges. They form one or more closed (but not necessarily convex) polygons called the boundary polygons of the plane cube set. Consecutive edges of a boundary polygon are the consecutive edges of a polygonal fan whose members are all internal polygons. It is these boundary polygons that are traced by Step M6.

Figure 15:
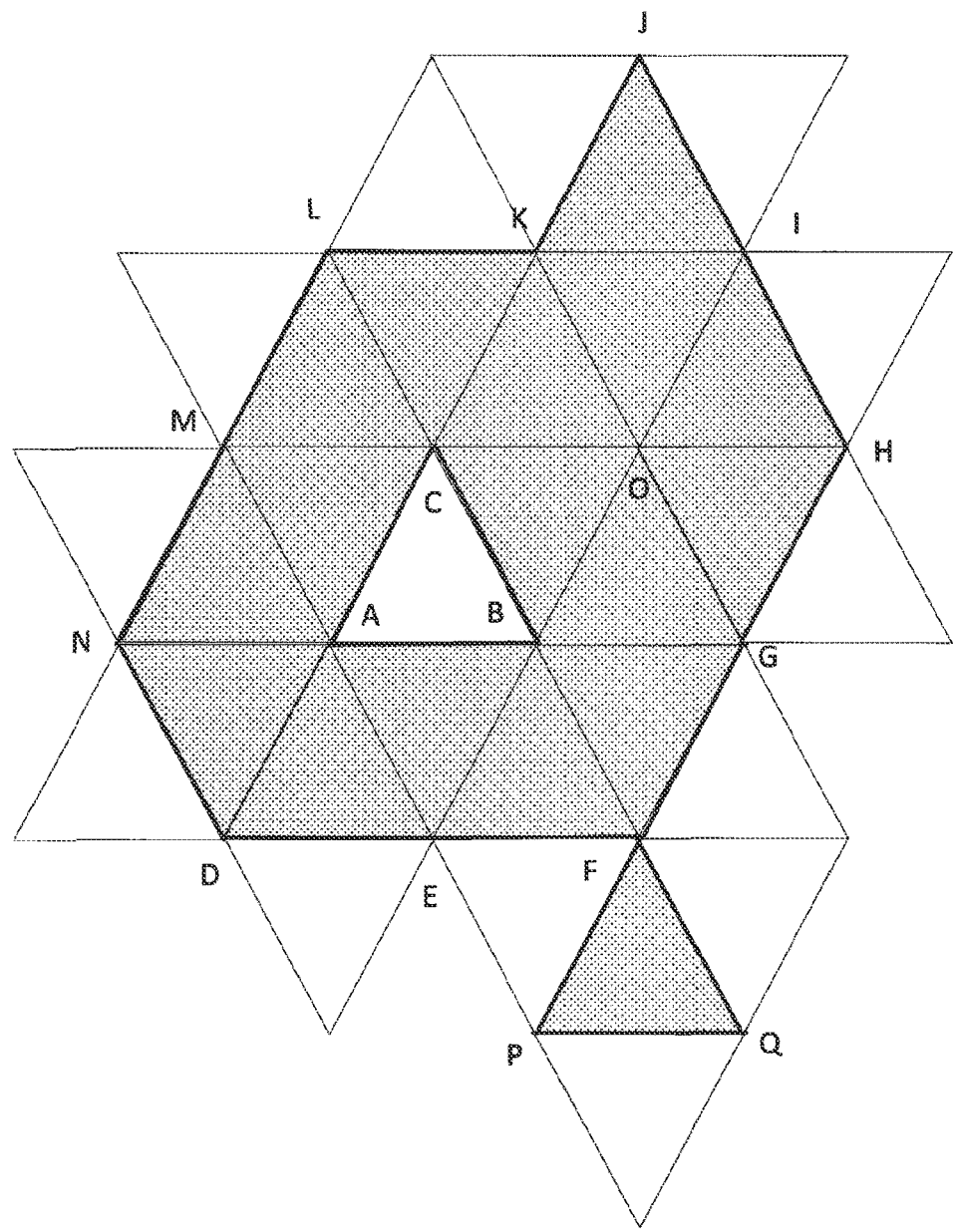
FIG. 15 is a plan view showing an exemplary method of tracing the boundary polygons of plane cube sets.

A plane cube set will have more than one boundary polygon if it has one or more holes in the plane cube set and/or if the cubes of the plane cube set form one or more parts each of which is disconnected from other parts of the same cube set, or is connected to the others only by common vertexes. An example is illustrated in FIG. 15 where for ease of drawing all the polygons are triangles. The shaded polygons are all internal polygons. The unshaded polygons are external polygons that are coplanar neighbours of at least one internal polygon. With the exception of OIK, OKC and OBG, all the shaded polygons are also members of the plane boundary cube set. In FIG. 15 there are three boundary polygons: ABC, DEFGHIJKLMN, and PQF. Edges EF and FP are not consecutive edges of the same boundary polygon because the intersection polygons EFB and PQF are not members of a polygonal fan all of whose members are internal. By contrast edges HG and GF are consecutive edges of the 3 member polygonal fan formed by the polygons GHO, GOB and GBF. Similarly, AB and BC are consecutive edges of the 5 member polygonal fan formed by the polygons BAE, BEF, BFG, BGO and BOC.

The edges of the boundary polygons are traced as follows. See also FIG. 7.

Z1. Create an empty list of boundary polygons.

Z2. If the plane cube boundary set is empty then stop.

Z3. Select the first cube in the plane cube set as the current cube.

Z4. Mark all the external edges in the intersection polygon of the current cube as unused.

Z5. If the current cube is not the last in plane boundary cube set then set the next cube in the set as the current cube and go to Step Z4. Steps Z4 and Z5 loop over all cubes in the plane boundary set and ensure that all the external edges of their intersection polygons are marked as unused.

Z6. Create a new empty boundary polygon. The boundary polygon is a list of external edges that will now be grown in the order in which they are traced around one boundary of the common plane.

Z7. Select the first cube in the plane boundary cube set as the current cube.

Z8. Select any unused external edge in the intersection polygon of the current cube as the current edge.

Z9. Label the two nodes of the current edge as A and B. The edge will be treated as starting at node A and ending at node B. The choice of the direction of the edge is arbitrary here.

Z10. Add the current edge to the boundary polygon. Also store the cube that contains the current edge for use at Steps U2 and U7.

Z11. Mark the current edge as used.

Z12. Find the next polygon edge in the intersection polygon of the current cube. This is the unique edge (other than AB) of the current polygon, which has B as one of its nodes. Label the other node of the next polygon edge as C. As FIG. 16 illustrates, the position of the next edge depends on which node of the current edge is the B node.

Z13. If the next edge is an external edge go to Step Z18.

Z14. If the intersection of the polygon of the current cube does not have any remaining unused external edges then remove the current cube from the plane boundary cube set.

Z15. Set the current cube to the unique coplanar neighbour cube whose intersection polygon contains the next edge BC.

Z16. Set the next edge to the other edge in the current cube that has node B as one of its nodes. Label the other node as C.

Z17. If the next edge is not an external edge go to Step Z15 otherwise go to Step Z18. Steps Z15 to Z17 loop across a polygonal fan until they find a member of the fan that has an external edge connected to the central vertex of the fan. Suppose for example that at the start of Step Z15 the edge HG in FIG. 15 is the current edge and that GO is the next edge. Note that Step Z13 already has tested that GO is not an external edge. Step Z15 sets the current intersection polygon to GOB. Step Z16 sets the next edge to GB. Step Z17 causes the action to return to Step Z15 because GB is also not an external edge. Step Z15 now sets the current intersection polygon to GBF and Step Z16 sets the next edge to GF. Now at last the next edge GF is an external edge so that Step Z17 causes the action to exit the loop. On the other hand, if at the start of Step Z15 the current and next edges are GF and FB then Step Z15 sets the current intersection polygon to FBE and Step Z16 sets the next edge to FE, which is an external edge so that Step Z17 immediately exits the loop. As a final example, suppose that at the start of Step Z15 the current and next edges are AB and BE. Then Step Z15 sets the current intersection polygon to BEF and Step Z16 sets the next edge to BF. Because BF is not an external edge Step Z17 returns the action to Step Z15. Steps Z15 to Z17 are repeated, considering in turn the edges BG and BO, neither of which is external, and then the external edge BC when the loop exits.

Z18. If the next edge is not the same as the first edge in the boundary polygon then set the current edge to the next edge and go to Step Z10.

Z19. If the intersection of the polygon of the current cube does not have any remaining unused external edges then remove the current cube from the plane boundary cube set.

Z20. Add the boundary polygon to the list of the boundary polygons.

Z21. If the plane boundary cube set is not empty then go to Step Z6 otherwise stop.

FIG. 8 is a flow chart of Step M7 showing in detail the Steps U1 to U11 that are applied to calculate the positions of the cloud boundary points. Steps U1 to U11 are applied to each separate boundary polygon calculated at Step M6. Note that the A and B nodes required at Steps U4 and U8 can either be stored at Step M6 or else they can be deduced by comparing with the vertices of the preceding and next edges in the boundary polygon.

U1. Set the current edge to the first edge in the boundary polygon.

U2. Set the current cube to the cube in which the current edge is located. The identity of the cube in which any edge is located was stored at Step Z10 when the boundary polygon was traced. The cube is a member of the plane cube set.

U3. Set the leading edge to the current edge.

U4. Set P to the A node of the current edge.

U5. If the current edge is the last edge in the boundary polygon then go to Step U8.

U6. Get the next edge from the boundary polygon.

U7. If the next edge is located in the current cube then set the current edge to the next edge and go to Step U6. The identity of the cube in which any edge is located was stored at Step Z10 when the boundary polygon was traced. Steps U6 and U7 are repeated until the current edge is the last edge in the current cube.

U8. Set Q to the B node of the current edge.

Figure 17:
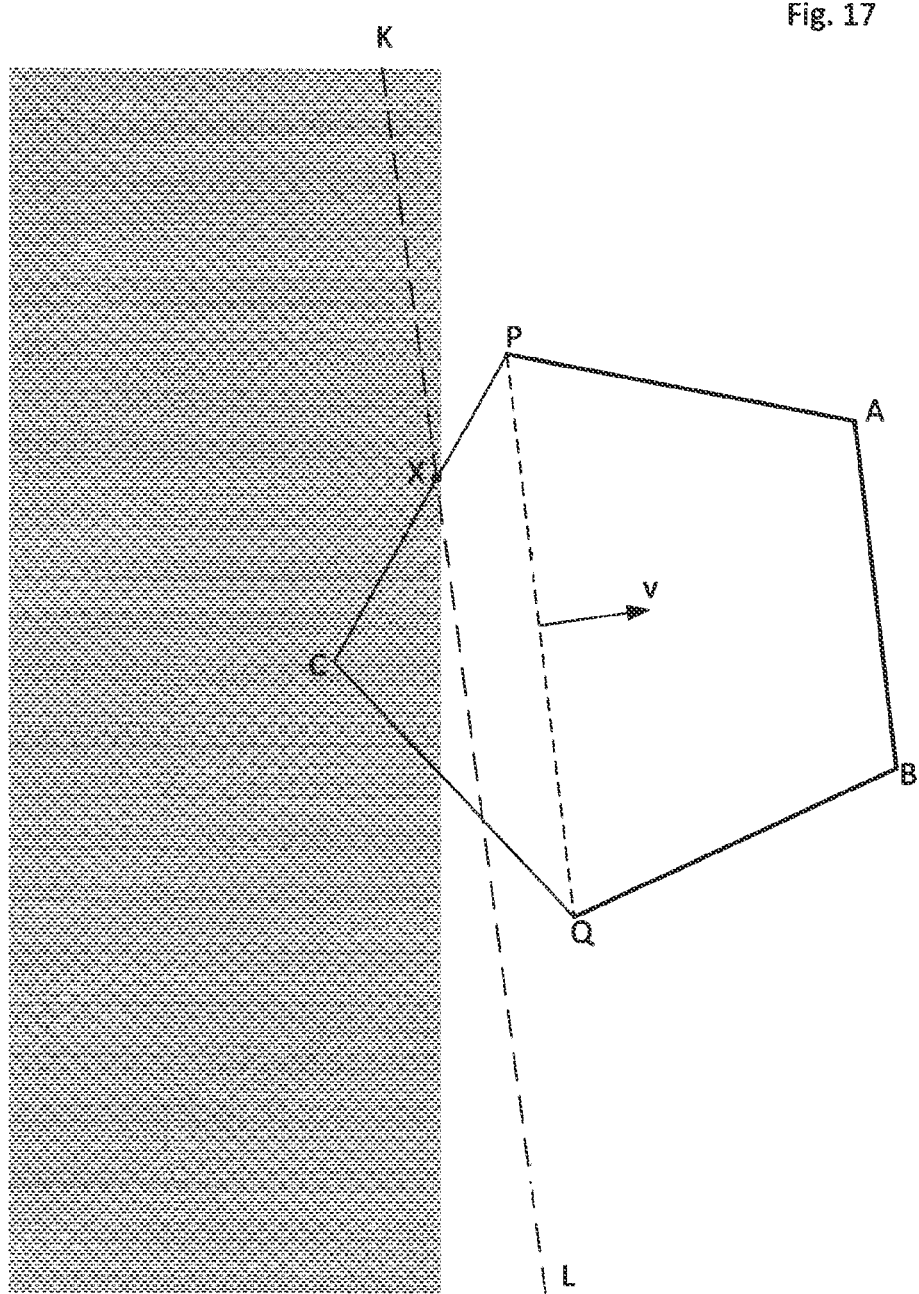
FIG. 17 is a plan view showing an exemplary method for calculating the cloud boundary point in the case that point cloud boundary is linear within an intersection polygon.
Figure 18:
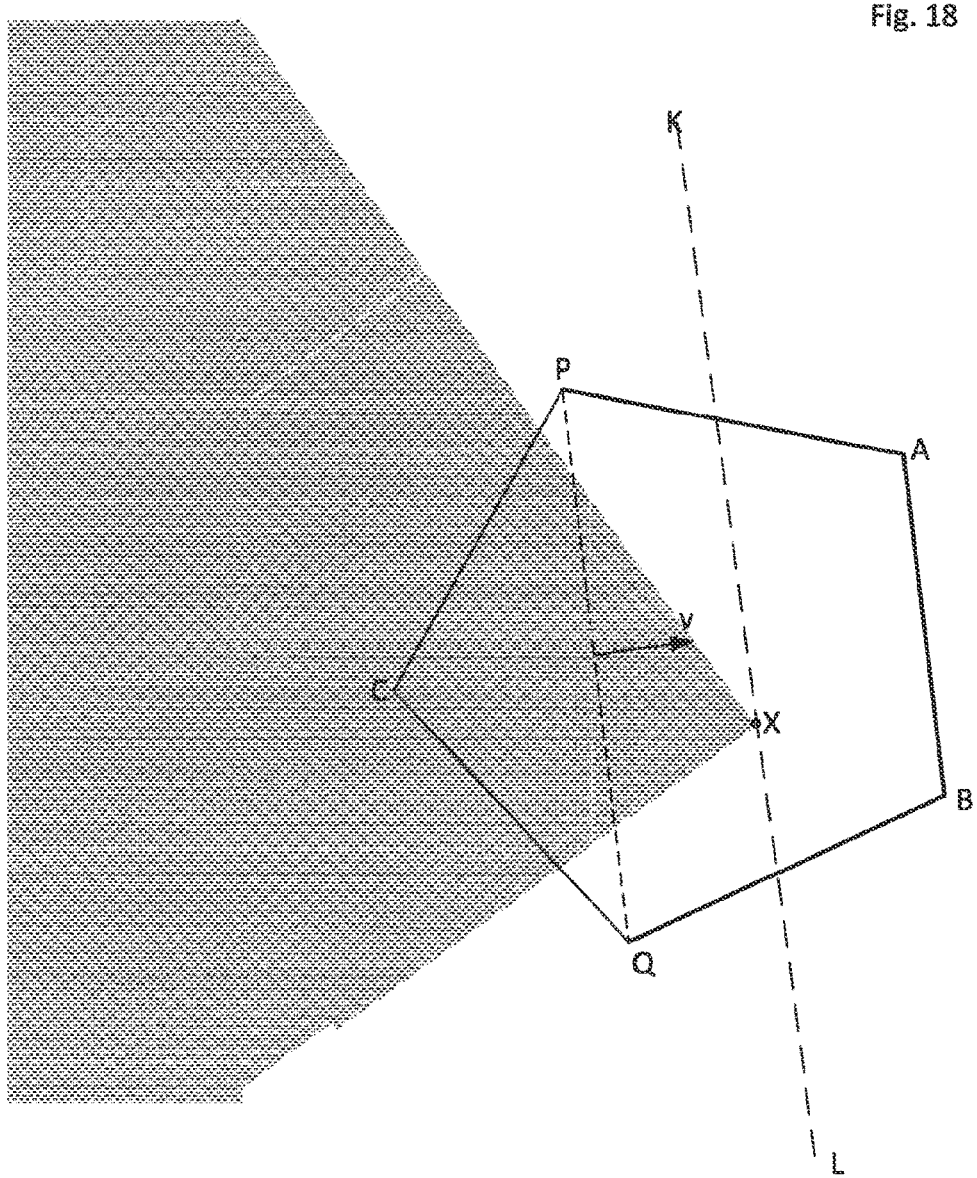
FIG. 18 is a plan view showing an exemplary method for calculating the cloud boundary point in the case that point cloud boundary is non-linear within an intersection polygon.
Figure 19:
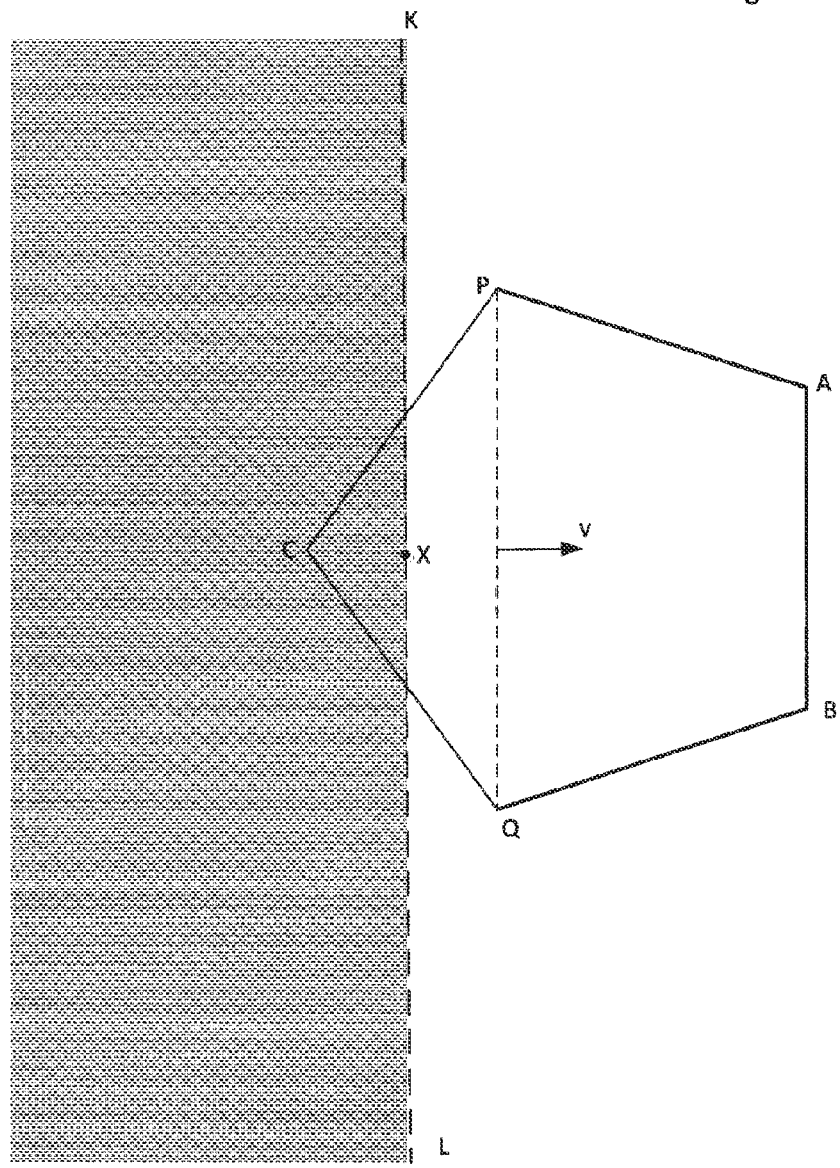
FIG. 19 is a plan view showing an exemplary method for calculating the cloud boundary point in the case that there is more than one candidate cloud boundary point.

U9. Set the cloud boundary point to the projected point cloud point with maximum directed distance to the line PQ. Point cloud points are projected onto the plane using the formula of Step Y4. The directed distance $d_k$ of the projected point $p^{(k)}$ can be calculated by $d_k = v^T(p^{(k)} - q)$ where q is any point in the line PQ (most conveniently either P or Q) and where v is the normal to PQ, lies in the common plane and is of unit length. Note that $-v$ also satisfies these conditions. The correct choice of v and $-v$ is made by testing that $d_k$ is non-negative for any vertex of the current intersection polygon that is also a vertex of the boundary polygon, and that $d_k$ is non-positive for any other vertex. There is always at least one vertex of the intersection polygon at which $d_k$ is non-zero so that its sign can be distinguished. The geometry of Step U9 is illustrated in FIGS. 17 to 19. In all three figures the intersection polygon is PCQBA and the edges of the boundary polygon are QB, BA and AP. Only vertex C does not lie on the boundary polygon. The normal vector v is shown in the direction in which $d_k$ must increase. The point cloud is represented by the shaded region. The projected point cloud point which maximizes the directed distance is marked X and KL is the line through X that is parallel to PQ.

U10. If there are other projected point cloud points within the intersection polygon that are close to the straight line through the cloud boundary point and parallel to PQ then set the cloud boundary point to the average of all the projected point cloud points sufficiently close to the parallel line through the position of the cloud boundary point calculated in Step U9. Here "sufficiently close" means all projected point cloud points whose distance to the parallel line is less than a specified tolerance, which should be a small fraction, say a quarter or a tenth of the resolution. The geometry of Step U10 is illustrated in FIG. 19 where KL is the edge of the projected point cloud. Assuming that the point cloud points are uniformly distributed then the average of the points within PCQBA that are sufficiently close to KL will be approximately at X.

U11. If the current edge is not the last edge in the boundary polygon then set the current edge to the next edge in the boundary polygon and go to Step U2 otherwise stop.

FIG. 9 is a flow chart of Step M8 showing in detail the Steps V1 to V14 that are applied to move cloud boundary points to the line intersection between pairs of common planes.

V1. Create a list of the common planes of all the plane cube sets. This list contains the normal vectors and means of the common planes.

V2. If the list of common planes is empty then stop.

V3. Set the current plane to the first common plane in the list of common planes.

V4. Set the current cloud boundary point to first cloud boundary point in the current plane. The cloud boundary points can be listed in any order for the purposes of Step M8. In particular no distinction is necessary between cloud boundary points associated with different boundary polygons.

V5. Set the minimum distance to infinity. Here infinity means any positive number that is guaranteed to be larger than the distance of the cloud boundary point to any common plane. A suitable value for infinity is 10 to the power of 30.

V6. Set the neighbour plane to the first common plane in the list of common planes.

V7. If the neighbour plane is the same as the current plane then go to Step V11.

V8. If the angle between the normal vectors of the current and neighbour planes is sufficiently small (say less than 1 degree) then go to Step V11. The purpose of this test is to prevent the attempted calculation of the intersection of nearly parallel planes.

V9. Project the current cloud boundary point on to the neighbour plane, or more precisely on to the straight line formed by the intersection of the current and neighbour planes. The current cloud boundary point $x^{(k)}$ is projected onto the point $$p^{(k)} = x^{(k)} - \frac{\beta_i - \alpha\beta_j}{1-\alpha^2}u^{(i)} - \frac{\beta j - \alpha\beta i}{1-\alpha^2}u^{(j)}$$

which lies on the straight line formed by the intersection of the two common planes $$[u^{(i)}]^T(x - \bar{x}^{(i)}) = 0$$
$$[u^{(j)}]^T(x - \bar{x}^{(j)}) = 0$$

where $\alpha = [u^{(i)}]T$ $(u^{(j)})$, $\beta_i = [u^{(i)}]^T(x^{(k)} - \bar{x}^{(i)})$ and $\beta_j = [u^{(j)}]^T(x^{(k)} - \bar{x}^{(j)})$. Geometrically $p^{(k)}$ is the nearest point to $x^{(k)}$ on the straight line. Note that both normal vectors $u^{(i)}$ and $u^{(j)}$ must be of unit length.

V10. If the distance D between the current cloud boundary point and its projection is less than the minimum distance then set the minimum distance to D and set the best projected point to current projected point.

V11. If the neighbour plane is not the last plane in the list of common planes then set the neighbour plane to the next plane in the list of common planes and go to Step V7.

Figure 20:
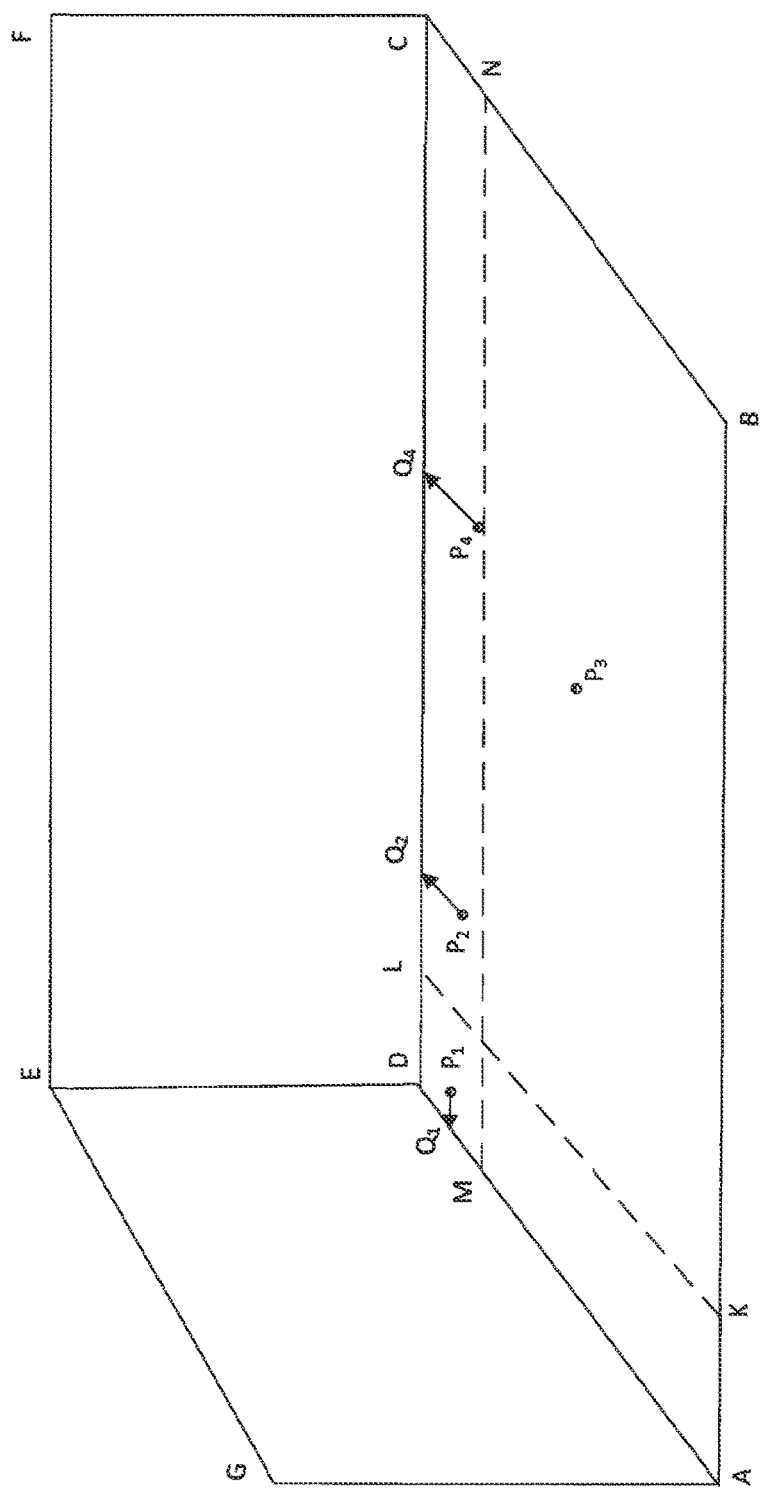
FIG. 20 is a perspective view showing an exemplary method of moving cloud boundary points onto the intersections of planes.

V12. If the minimum distance is sufficiently small then move the position of the current cloud boundary point to that of the best-projected point and go to Step V13. Here "sufficiently small" means a small fraction—say a quarter or a tenth—of the resolution. In FIG. 20, which illustrates the geometry, ABCD is the common plane of a particular plane cube set, and DCFE and ADEG are the common planes of two nearby plane cubes sets which intersect ABCD along DC and AD. The dashed lines MN and KL are parallel to DC and AD and indicate the distance at which points are considered to be sufficiently close to the intersection lines. The points $P_1$, $P_2$, $P_3$ and $P_4$ are example positions of cloud boundary points. The distances of $P_2$ and $P_4$ to DC are sufficiently small so that they are moved onto their projections $Q_2$ and $Q_4$. The cloud boundary point $P_1$ is sufficiently close to both DC and AD. However it is closer to AD and is therefore moved to $Q_1$. By contrast $P_2$ is not sufficiently close to either intersection is therefore not moved.

V13. If the current cloud boundary point is not the last cloud boundary point in the list of cloud boundary points for the current plane then set the current cloud boundary point to the next cloud boundary point in the list and go to Step V5.

V14. If the current plane is not the last in the list of common planes then set the current plane to the next plane in the list of common planes and go to Step V3. Otherwise stop.

FIG. 10 is a flow chart illustrating the Steps W1 to W24, which grow sets of contiguous collinear cubes that are intersected by a common straight line (called the common line). Each set of collinear cubes grown in this way is called a line cube set. The calculation accumulates the number of points in the line cube set $$n = \sum_l n_l$$

where $n_l$ is the number of points in collinear cube l. The calculation also accumulates the sum of the point cloud points $$s = \sum_l s^{(l)},$$

where $$s^{(l)} = \sum_{k=1}^{n_l} x^{(k,l)}$$

and the sum of the outer products $$W = \sum_l W_l,$$

where $$W_l = \sum_{k=1}^{n_l} x^{(k,l)}[x^{(k,l)}]^T$$

and where in both cases the summation is over all point cloud points in all collinear cubes l in the line cube set, and where $x^{(k,l)} = (X_{kl}, Y_{kl}, Z_{kl})$ is the kth point cloud point in collinear cube l.

The mean $\bar{x}$ and covariance matrix V of the point cloud points in all the collinear cubes in the line cube set can computed by $$\bar{x} = s/n \text{ and } V = \frac{1}{n}W - \bar{x}\bar{x}^T$$

Similarly, the mean $\bar{x}^{(l)}$ and covariance matrix $V^{(l)}$ of the point cloud points in the collinear cube l can be computed by $$\bar{x}^{(l)} = s^{(l)}/n_l \text{ and } V^{(l)} = \frac{1}{n_l}W^{(l)} - \bar{x}^{(l)}[\bar{x}^{(l)}]^T$$

Any point x on the mathematical line through all the point cloud points in the collinear cube l can be written as $x = \bar{x}^{(l)} + \alpha u^{(l)}$ where $\alpha$ is a scalar parameter, and where $u^{(l)}$ is the eigenvector of the covariance matrix $V^{(l)}$ that corresponds to the unique largest eigenvalue of $V^{(l)}$, and is calculated as a by-product by Jacobi's method when it is used to compute the eigenvectors of $V^{(l)}$.

Similarly, any point on the mathematical plane through all the point cloud points in all the cubes of the plane cube set can be written as $x = \bar{x} + \alpha u$ where u is the vector of unit length that is normal to the common line, is equal to the eigenvector of the accumulated covariance matrix V that corresponds to the unique largest eigenvalue of V, and can be calculated by Jacobi's method.

At Steps W14 and W21 the method compares the mathematical straight line along the currently accumulated cube line set with the line fitted through the current collinear cube l to decide whether the two straight lines are themselves collinear. A different criterion is used in the two steps.

Criterion A is used in Step W14 and requires that $u^T u^{(l)} > \cos \theta_0$ which ensures that the angle between the two planes is less than $\theta_0$ radians, an $|u^T (\bar{x}^{(l)} - \bar{x})| < d_1$ which ensures that the distance of the mean $\bar{x}^{(l)}$ is less than $d_1$ distance units. Criterion A here is identical to Criterion A used in Step B14 except that here u is the vector along the common line rather than the normal vector of the common plane. FIG. 13 may be re-interpreted in this light.

Criterion C is used in Step W21 and requires that $$\frac{1}{n_l}\sum_{k=1}^{n_l}\{(\bar{x}-x^{(k,l)})^T(\bar{x}-x^{(k,l)})-[u^T(\bar{x}-x^{(k,l)})]^2\}<d_2$$

which ensures that the average squared distance of each point $x^{(k,l)}$ in collinear cube l from the common line is less than $d_2$ distance units.

W1. Create an unused list of cubes containing all the collinear cubes that were identified at Step M2. Any cube in this list is called an unused cube.

W2. If the unused list is empty then stop.

W3. Create an empty list of cubes called the line cube set. This line cube set will be grown to contain all the collinear cubes that are intersected by a common straight line. Eventually every cube that is currently in the unused list of cubes will be moved to a line cube set, even if that line cube set contains only one cube.

W4. Set the current cube to the first cube in the unused list.

W5. Create an empty list of cubes called the candidate list. This list will contain unused collinear cubes that are being considered as candidates for inclusion in the line cube set.

W6. Create an empty list of cubes called the special list. This list will contain unused collinear cubes that have recently been rejected as candidates for inclusion in the line cube set.

W7. Move the current cube from the unused list into the line cube set. Thus every line cube set contains at least one cube.

W8. Set the sum of the points in the line cube set equal to the sum of the points in the current cube.

W9. Set the sum of the outer products of the points in the line cube set equal to the sum of the outer products of the points in the current cube.

W10. Add all neighbour cubes of the current cube that are in the unused list to the candidate list. Here a cube is neighbour of the current cube if it shares a face or vertex with the current cube.

W11. If the candidate list is empty go to Step W18.

W12. Set the current cube to the first cube in the candidate list.

W13. Remove the current cube from the candidate list.

W14. If the current cube does not satisfy criterion A then add the current cube to the special list and go to Step W11.

W15. Move the current cube from the unused list to the line cube set.

W16. Add $s_1$ the sum of the points in the current cube l to the accumulated sum s of the points in the line cube set.

W17. Add $W_1$ the sum of the outer products of the points in the current cube l to the accumulated sum W of the outer products of the points in the line cube set and go to Step W10.

W18. If the special list is empty then output the line cube set data and go to Step W2.

W19. Set the current cube to the first cube in the special list.

W20. Remove the current cube from the special list.

W21. If the current cube does not satisfy criterion C then go to Step W18.

W22. Move the current cube from the unused list to the line cube set.

W23. Add $s_1$ the sum of the points in the current cube l to the accumulated sum s of the points in the line cube set.

W24. Add $W_1$ the sum of the outer products of the points in the current cube l to the accumulated sum W of the outer products of the points in the line cube set and go to Step W18.

FIG. 11 is a flow chart of Step M11 showing in detail the steps T1 to T8 that are applied to each cube in a line cube set to ensure that every cube in the line cube set is intersected by its common line. The effect of Step M11 is to flatten the line cube set. Step M11 is necessary because the common plane changes whenever a new cube is added to the plane cube set in Step M10. There is no guarantee that cubes added early in the growth process of a line cube set will continue to be intersected by the common line after it has changed. Step M11 compensates for this. Steps T1 to T8 are applied separately to every cube in the plane cube set and can therefore be applied in parallel if required.

The steps of the line cube set flattening process are as follows.

T1. If the cube is intersected by the common line then stop. (No further action is required on this cube.)

T2. Remove the cube from the line cube set.

T3. Set the current point to the first point cloud point in the cube.

T4. Project the current point $x^{(k)}$ on to the nearest point $p^{(k)}$ on the common line $x=\bar{x}+\alpha u$ using the formula $p^{(k)}=\bar{x}-[(\bar{x}-x^{(k)})^T u]u$ where $\bar{x}$ is the centroid of the points in the cube line set.

T5. Find the cube that contains the projected point. Call this cube the projected cube. See Step Y5 for details of how the projected cube can be calculated.

T6. If the projected cube does not belong to the line cube set then add the projected cube to the line cube set.

T7. If the current point is the last point cloud point in the cube then stop.

T8. Set the current point to the next point cloud point in the cube and go to Step T4.

FIG. 12 is a flow chart of Step M12 showing in detail Steps S1 to S16 that are applied to identify the end points of the common lines of line cube sets. At the stage that Step M12 is applied, each line cube set has the property that all its cubes are intersected by its common line. Any cube intersected by the common line (including cubes that are not members of the line cube set) meets the common line at two points (which may be co-incident) called the cube's intersection points.

Any two cubes that are intersected by the common line and that share an intersection point are called collinear neighbours. Any intersection point that is shared by two collinear neighbours, of which only one is a member of the line cube set, is called an end point of the cube line set. Step M12 allows for the possibility that a line cube set may have more than two end points.

Step M12 is applied separately to each line cube set. It progressively removes cubes from the cube line set until that set is empty. Step M12 can be applied in parallel.

S1. Create an empty list of A and B node pairs. At the completion of Step M12, each node pair in the list will represent the two end points of one line segment along the common line of the line cube set.

S2. If the line cube set is empty then stop.

S3. Set the current cube to the first cube in the line cube set.

S4. If the current cube does not contain an end point of the line cube set, then remove the current cube from the line cube set and go to Step S6.

S5. Set the current cube to the next cube in the cube line set and go to Step 4. In Step S5 the next cube can be any cube remaining in the cube line set.

S6. Set the current node pair to the intersection points of the current cube.

S7. If both nodes of the current node pair are endpoints of the line cube set, then label one node as A and label the other node as B and go to Step S16.
S8. Save the unique endpoint of the current node pair as A.
S9. Set the next cube to the unique neighbour cube of the current cube that is also a member of the line cube set.
S10. Save the current cube as the previous cube.
S11. Set the current cube to the next cube.
S12. Remove the current cube from the line cube set.
S13. Set the current node pair to the intersection points of the current cube.
S14. If both nodes of the current node pair are not endpoints then set the next cube to the unique neighbour cube that is not the previous node and go to Step S10.
S15. Save the unique end point as the B node.
S16. If the A and B nodes are not co-incident (to within a tolerance) then add the A and B nodes to the list of node pairs.
S17. Go to Step S2.

Although the above specific embodiment of the invention describes using cubes (other tessellating space-filling shapes, including tetrahedra), one skilled in the art will recognize that overlapping volumes may also be used, in particular overlapping spheres. In such an embodiment, neighbouring volumes may be defined as those volumes whose central points lie within a predetermined distance from the central point of the volume in question.

Figure 21:
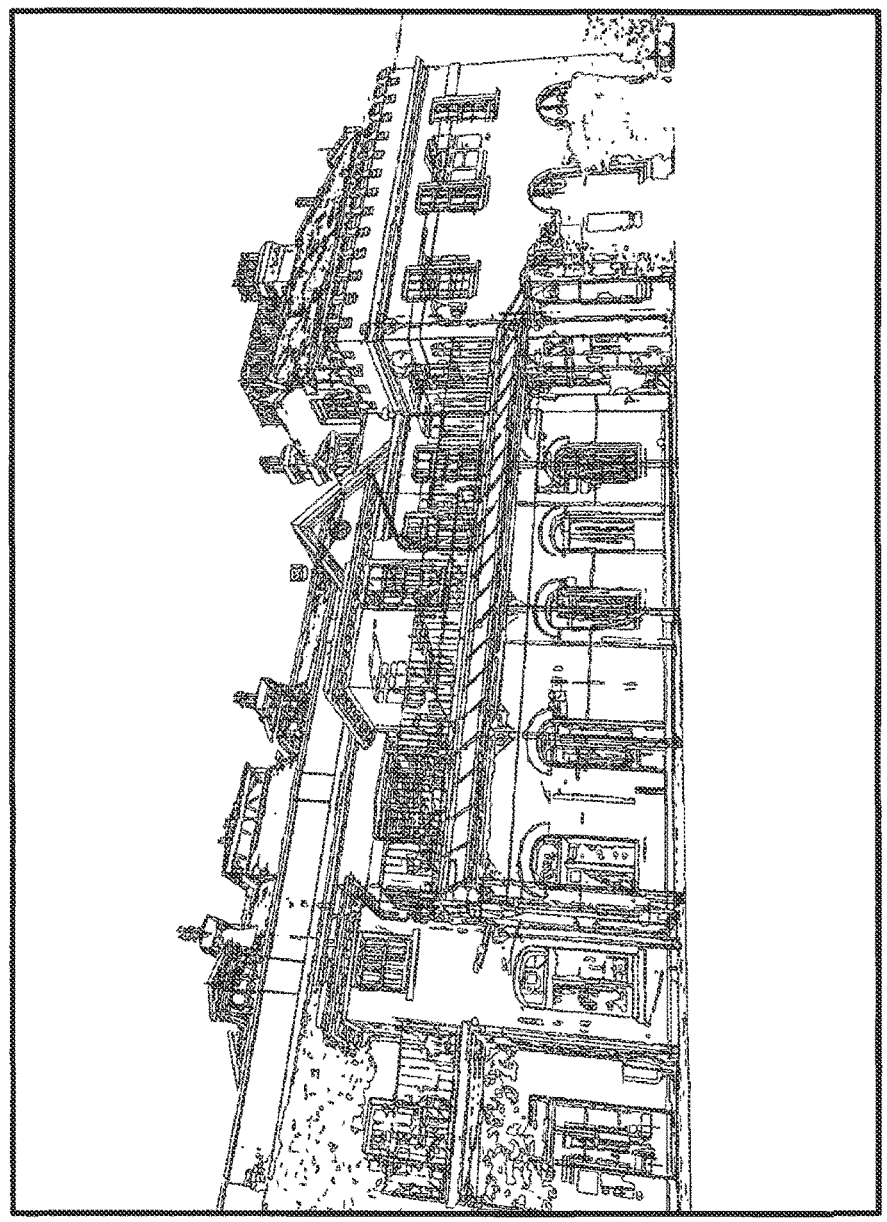
FIG. 21 is a line drawing for use in an architectural scenario resulting from the method described herein performed on a particular set of point cloud data.

FIG. 21 shows the result of a conversion from point cloud data to a vector graphics drawing for an architectural scene. Measurements of particular dimensions in the drawing can be readily determined and an architect can manipulate the vector graphics drawing to produce a modified design drawing. This avoids the problem of the architect needing to have laborious measurements of the physical buildings/environment taken and a 3D model made from scratch.

One skilled in the art will appreciate that a variety of different technologies may be used for the generation of point cloud data including LIDAR and photogrammetry techniques. Different variations of these technologies may produce different point clouds containing more than just position data. This additional data may also be incorporated into the method described. For example, each point in the point cloud may include colour or intensity information. Once a surface is identified, colouring or intensity mapping of the surface may be performed on the model using the colour or intensity of the points originally identifying the surface.

The method described may also be used in combination with other imaging techniques to improve the accuracy of 3D models and/or overlay the model with further imaging data. For example, a scanner may be used in conjunction with a three-dimensional camera. Scanning and three-dimensional photography may be performed simultaneously so that photo-real three-dimensional environments may be generated.

As many apparently different embodiments of the present invention can be made without departing from the scope thereof, it is to be understood that the invention is not limited to the specific embodiments thereof.

The invention claimed is:

1. An apparatus for converting point cloud data of a set of one or more objects into three-dimensional representations of the set of objects, comprising:
   means for partitioning a space occupied by the set of objects into a plurality of volumes;
   means for determining whether the points in each volume approximately coexist on a surface, wherein such volumes are designated surface volumes and the surface on which points coexist is designated as the surface of the surface volume;
   means for combining a first plurality of neighbouring surface volumes which approximately coexist along similar surfaces into a surface volume set, wherein the similar surfaces are identified as a larger surface; and
   means for identifying a surface edge volume set of the surface volume set, by identifying members of the surface volume set that have neighboring volumes that do not belong to the surface volume set but are intersected by the larger surface.

2. The apparatus of claim 1, further comprising means for generating point cloud data of the set of objects.

3. The apparatus of claim 2, wherein the means for generating point cloud data is a light detecting and ranging LIDAR-scanner.

4. The apparatus of claim 3, wherein the scanner is adapted to move along a path and generate point cloud data from a plurality of scanning points along the path.

5. The apparatus of claim 2, wherein the means for generating point cloud data is a scanner comprising:
   a camera configured to capture one or more images of a set of objects; and
   a processor configured to perform photogrammetry techniques on the images.

6. The apparatus of claim 1, further comprising:
   means for estimating a cloud boundary point for each edge of each volume in the surface edge volume set, wherein an edge is defined by the intersection of the larger surface of the surface volume set with a boundary between a volume in the surface edge volume set and an empty volume.

7. The apparatus of claim 6, further comprising:
   means for identifying where cloud boundary points lie close to curves formed by the intersections of the larger surfaces; and
   means for moving the positions of the cloud boundary points on to the intersection curves.

8. The apparatus of claim 1, further comprising:
   means for determining whether the points in each volume approximately coexist on a curve, wherein such volumes are identified as curve volumes and the curve on which points coexist is identified as the curve of the curve volume;
   means for combining a first plurality of neighbouring curve volumes which are intersected by similar curves into a curve volume set, wherein the intersecting curves are identified as a larger curve; and
   means for identifying end points to define a curve segment.

9. A method for converting point cloud data of a set of one or more objects into three-dimensional representations of the set of objects, comprising:
   partitioning a space occupied by the set of objects into a plurality of volumes;
   determining whether the points in each volume approximately coexist on a surface, wherein such volumes are designated surface volumes and the surface on which points coexist is designated as the surface of the surface volume;
   combining a first plurality of neighbouring surface volumes which approximately coexist on similar surfaces into a surface volume set, wherein the similar surfaces are identified as a larger surface; and
   identifying a surface edge volume set of the surface volume set, by identifying members of the surface volume set that have neighboring volumes that do not belong to the surface volume set but are intersected by the larger surface.

10. The method of claim 9, further comprising:
estimating a cloud boundary point for each edge of each volume in the surface edge volume set, wherein an edge is defined by the intersection of the larger surface of the surface volume set with a boundary between a volume in the surface edge volume set and an empty volume.

11. The method of claim 10, further comprising:
identifying where the cloud boundary points lie close to curves formed by the intersections of the larger surface; and
moving the positions of the cloud boundary points on to the intersection curves.

12. The method of claim 10, further comprising:
determining whether the points in each volume approximately coexist on a curve, wherein such volumes are identified as curve volumes and the curve on which points coexist is identified as the curve of the curve volume;
combining a first plurality of neighbouring curve volumes which are intersected by similar curves into a curve volume set, wherein the intersecting curves are identified as a larger curve; and
identifying end points to define a curve segment.

13. The method of claim 9, wherein the surface on which points coexist is a plane.

14. The method of claim 9, wherein the volumes are non-overlapping cubes and wherein neighbouring cubes share one or more common faces, edges or vertices.

15. The method of claim 9, wherein the volumes are non-overlapping space-filling tetrahedra or other space-filling tessellating shapes, not including non-overlapping cubes, and wherein neighbouring volumes share one or more common faces, edges or vertices.

16. The method of claim 9, wherein the volumes are overlapping spheres or other overlapping shapes.

17. The method of claim 9, wherein the point cloud data is derived from a plurality of scanning points.

18. The method of claim 17, wherein the plurality of scanning points lie on the path of a moving scanner.

19. The method of claim 9, wherein the three-dimensional representations are stored as a data file.

20. The method of claim 19, wherein the data file is stored as a vector graphics model.

21. The method of claim 20, wherein the vector graphics model is a 3D computer-aided design -CAD- model format.

22. The method of claim 21, wherein the 3D model is overlaid with imaging data.

23. The method of claim 21, wherein key features are identified in the 3D model.

24. The method of claim 23, wherein information about the key features is provided to a user.

25. A non-transitory memory storing a computer program comprising computer executable instructions to cause a computer to perform the method of claim 9.

* * * * *